US011056695B2

(12) United States Patent
Kakuwa

(10) Patent No.: US 11,056,695 B2
(45) Date of Patent: Jul. 6, 2021

(54) SOLID OXIDE FUEL CELL SYSTEM

(71) Applicant: Panasonic Intellectual Property Management Co., Ltd., Osaka (JP)

(72) Inventor: Takashi Kakuwa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 99 days.

(21) Appl. No.: 16/184,966

(22) Filed: Nov. 8, 2018

(65) Prior Publication Data
US 2019/0173110 A1    Jun. 6, 2019

(30) Foreign Application Priority Data
Dec. 1, 2017    (JP) .............................. JP2017-231844

(51) Int. Cl.
*H01M 8/04089*    (2016.01)
*H01M 8/04302*    (2016.01)
(Continued)

(52) U.S. Cl.
CPC ..... *H01M 8/04089* (2013.01); *H01M 8/0494* (2013.01); *H01M 8/04302* (2016.02);
(Continued)

(58) Field of Classification Search
None
See application file for complete search history.

(56) References Cited

U.S. PATENT DOCUMENTS

2010/0304243 A1    12/2010    Tsuchiya et al.
2017/0149078 A1*    5/2017    Morita .............. H01M 8/04022
(Continued)

FOREIGN PATENT DOCUMENTS

JP    2010-092836    4/2010
JP    2010-277845    12/2010
(Continued)

OTHER PUBLICATIONS

Makihito Nishioka et al., "Combustion Characteristics of Carbon Monoxide-Hydrogen-Nitrogen Coflow Diffusion Flame", Journal of the Combustion Society of Japan, vol. 48 No. 143, Feb. 2006, pp. 136-150 (English Abstract).

*Primary Examiner* — Tracy M Dove
(74) *Attorney, Agent, or Firm* — McDermott Will and Emery LLP

(57) ABSTRACT

A solid oxide fuel cell system includes a fuel cell stack that generates electric power through a reaction between a fuel gas and an oxidizing gas; a combustor in which anode and cathode off-gases discharged from the fuel cell stack are burned by diffusion combustion; a temperature sensor that detects temperature of the anode off-gas flowing into the combustor; and a controller. When the system is in at least one of the following states during power generation, the controller instructs the system to perform a power-generation control action for preventing failed combustion reactions: the temperature of the anode off-gas, detected by the temperature sensor, is below a first predetermined temperature for a predetermined continuous period of time; the temperature of the anode off-gas decreases by not less than a predetermined second temperature range during a predetermined period of time.

11 Claims, 14 Drawing Sheets

(51) Int. Cl.
    *H01M 8/04303*     (2016.01)
    *H01M 8/1007*     (2016.01)
    *H01M 8/04828*     (2016.01)
    *H01M 8/04664*     (2016.01)
    *H01M 8/0662*     (2016.01)
    *H01M 8/04746*     (2016.01)
    *H01M 8/0432*     (2016.01)
    *H01M 8/04955*     (2016.01)
    *H01M 8/124*     (2016.01)

(52) U.S. Cl.
    CPC ... *H01M 8/04343* (2013.01); *H01M 8/04686* (2013.01); *H01M 8/04753* (2013.01); *H01M 8/0662* (2013.01); *H01M 8/1007* (2016.02); *H01M 8/04955* (2013.01); *H01M 2008/1293* (2013.01)

(56) References Cited

U.S. PATENT DOCUMENTS

2017/0288246 A1*   10/2017   Mizuno ............. H01M 8/04022
2018/0366751 A1*   12/2018   Maeshima ........ H01M 8/04701

FOREIGN PATENT DOCUMENTS

JP           2011-204390      10/2011
WO    WO-2017104258 A1 *  6/2017  ......... H01M 8/04225

* cited by examiner

FIG. 2

CONDITIONS: EVALUATED UNDER BEST CONDITIONS FOR COMBUSTION WITH 80% Uf
(BEST FLAME JET VELOCITY; AIR RATIO, $\lambda = 1.5$)

| ANODE OFF-GAS TEMPERATURE (FUEL INLET TEMPERATURE) | 600°C | 300°C | HEATERS OFF |
|---|---|---|---|
| 1. FUEL JET VELOCITY: 2.0 m/s | O | SOME FLAMES LOST | FLICKERED; PARTIAL EXTINGUISHMENT OF FLAMES |
| 2. FUEL JET VELOCITY: 2.7 m/s | O | SOME FLAMES LOST | FLICKERED; PARTIAL EXTINGUISHMENT OF FLAMES |

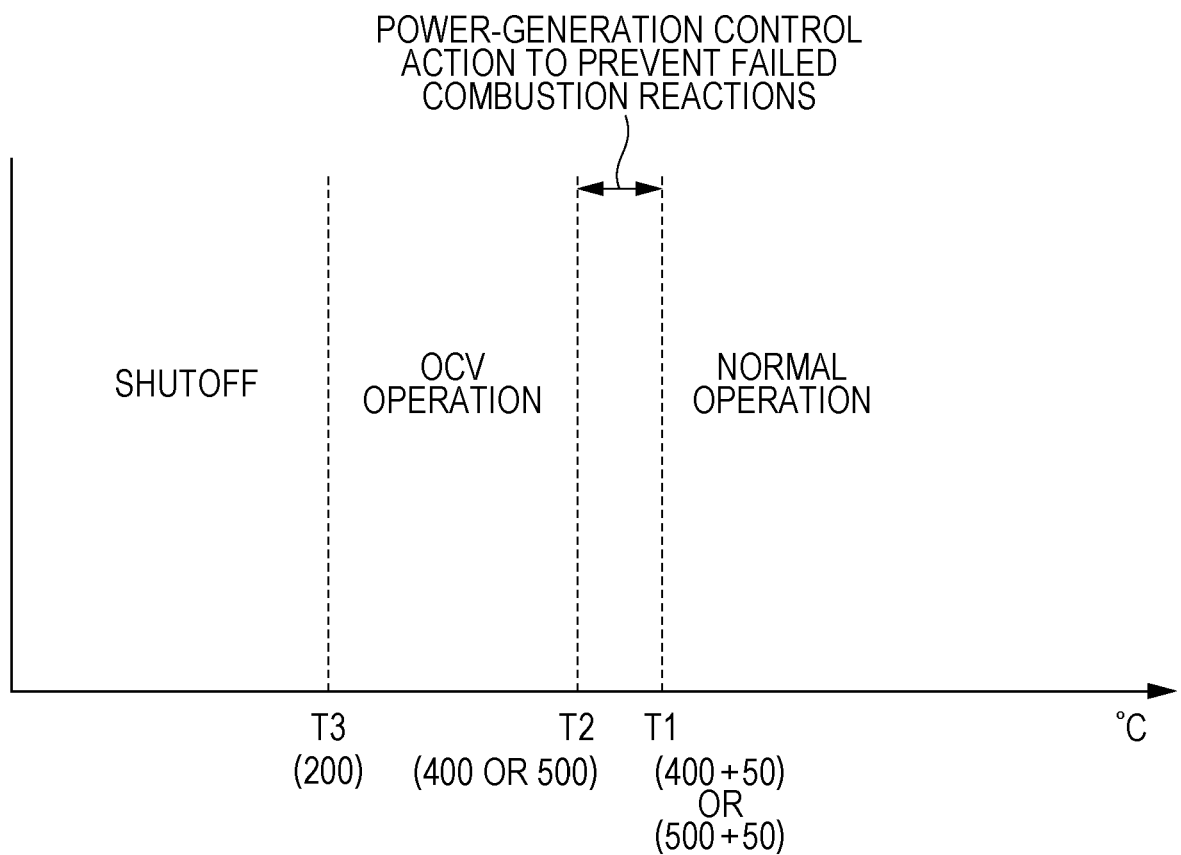

SOLID OXIDE FUEL CELL SYSTEM

BACKGROUND

1. Technical Field

The present disclosure relates to a solid oxide fuel cell system that includes a fuel cell stack that generates electric power using fuel and an oxidizer.

2. Description of the Related Art

Solid oxide fuel cell systems need to keep the operating temperature of their fuel cell stack high. In a configuration proposed to fulfill this requirement, an excess of fuel not consumed for power generation in the fuel cell stack (anode off-gas) is burned in a combustion chamber, and the resulting heat of combustion is utilized (e.g., Japanese Patent No. 5588709). Japanese Patent No. 5588709 discloses a configuration of a solid oxide fuel cell system that includes evaporators. An evaporator is connected to the system via a fuel exhaust gas discharge line, through which the exhaust gas discharged from a combustion chamber flows, and vaporizes reforming water using the heat of the exhaust gas. This evaporator is equipped with a temperature sensor, and the disclosed fuel cell system controls the fuel utilization according to the temperature detected by this temperature sensor. When the detected temperature falls below a limit set for fuel utilization control, the fuel utilization is reduced to prevent failed vaporization in the evaporator.

Other researchers have proposed solid electrolyte fuel cells capable of recognizing an extinguishment of flames in the combustion chamber (e.g., Japanese Patent No. 4692938). Japanese Patent No. 4692938 discloses a solid electrolyte fuel cell that burns anode and cathode off-gases above fuel cell stacks. The fuel cell has a controller and, when the controller determines that the combustion-associated temperature has fallen by a predetermined threshold decrease or to a greater extent, recognizes this state as an extinguishment of flames. With this configuration, the solid electrolyte fuel cell according to Japanese Patent No. 4692938 is capable of direct detection of an extinguishment of flames in the combustion chamber.

It has also been proposed to estimate the temperature of a combustion unit (combustion chamber) indirectly from a measured temperature of a reformer placed in the combustion unit (e.g., Japanese Patent No. 5412960). The fuel cell device according to Japanese Patent No. 5412960 is, accordingly, capable of simultaneous detection of the temperature of the reformer and combustion unit.

Moreover, a non-patent publication discloses a study on the combustion of CO—$H_2$ mixture (Makihito Nishioka, Tomoko Yamada, Daisuke Kawamata, and Yoko Kawaguchi, Combustion Characteristics of Carbon Monoxide-Hydrogen-Nitrogen Coflow Diffusion Flame, *Journal of the Combustion Society of Japan*, Vol. 48, No. 143 (2006) 136-150).

SUMMARY

The configurations of the related art according to the aforementioned patent publications, however, require either direct detection of high-temperature flames during combustion or the placement of a costly combustion catalyst in a downstream combustion exhaust gas line to reduce CO emissions. This means the disadvantages of the necessity of additional components, durability requirements for the sensor, and insufficient detection accuracy.

Worse yet, these known technologies can only detect a complete extinguishment of flames like a blowout of the flames and are not capable of recognize events such as incomplete combustion occurring in a lean-burn combustion. These technologies are also lacking in suitability for the detection of rough burning occurring in operations such as control for startup power generation (operation control that limits the output power and thus allows the stack(s) to heat), which a solid oxide fuel cell (SOFC) performs between startup control and power generation.

On the other hand, the non-patent publication only discusses a study that was conducted at ordinary temperature and with no water present on the fuel side (hydrogen/carbon monoxide). The findings are therefore not directly applicable to the combustion field of an SOFC system.

One non-limiting and exemplary embodiment provides an SOFC system that is highly reliable by virtue of reduced failed reactions in the combustion during power generation.

In one general aspect, the techniques disclosed here feature a solid oxide fuel cell system. The solid oxide fuel cell system includes a fuel cell stack that generates electric power through a reaction between a fuel gas and an oxidizing gas; a combustor in which anode and cathode off-gases discharged from the fuel cell stack are burned by diffusion combustion; a temperature sensor that detects temperature of the anode off-gas flowing into the combustor; and a controller. While the solid fuel cell system is in power-generating operation and when the controller determines that the system is in at least one of the following states (i) and (ii), the controller instructs the system to perform a power-generation control action for preventing failed reactions in the diffusion combustion: (i) the temperature of the anode off-gas, detected by the temperature sensor, is below a first predetermined temperature for a predetermined continuous period of time; and (ii) the temperature of the anode off-gas decreases by not less than a predetermined second temperature range during a predetermined period of time.

With such a configuration, a solid oxide fuel cell system according to an aspect of the present disclosure is highly reliable owing to reduced failed reactions in combustion during power generation.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a table comparing relationships between the anode off-gas temperature (fuel inlet temperature), which is the temperature of fuel (anode off-gas) jetted from nozzles, and the fuel's burning status in the combustion field of an SOFC system;

FIG. 15 illustrates the relationship between the operation of an SOFC system according to an embodiment of the present disclosure and the first, third, and fourth predetermined temperatures T1, T2, and T3.

DETAILED DESCRIPTION

Underlying Knowledge Forming Basis of the Present Disclosure

For SOFC systems that mix and burn anode and cathode off-gases in a combustion chamber, different combustion fields are expected between an oxide-ion-conducting SOFC, in which the electrolyte is a conductor of oxide ions, and a proton-conducting SOFC, which uses a proton-conducting electrolyte. To be more specific, an oxide-ion-conducting SOFC transports the oxide ion from the air electrode (cathode) side to the fuel electrode (anode) side through the electrolyte, whereas a proton-conducting SOFC transports the proton from the fuel electrode (anode) side to the air electrode (cathode) side through the electrolyte. This means that in the case of an oxide-ion-conducting SOFC, water resulting from power generation gets mixed in the anode off-gas, whereas in a proton-conducting SOFC, water resulting from power generation gets mixed in the cathode off-gas. This probably leads to greatly different combustion fields of oxide-ion-conducting and proton-conducting SOFCs.

In addition, the operating temperature of proton-conducting SOFCs is approximately 600° C., lower than that of oxide-ion-conducting SOFCs. This operating temperature can be further lowered by advances in performance.

Starting from this knowledge, the inventors have been keenly studying the characteristics of burning in SOFC systems, with the following findings.

Figure 1:
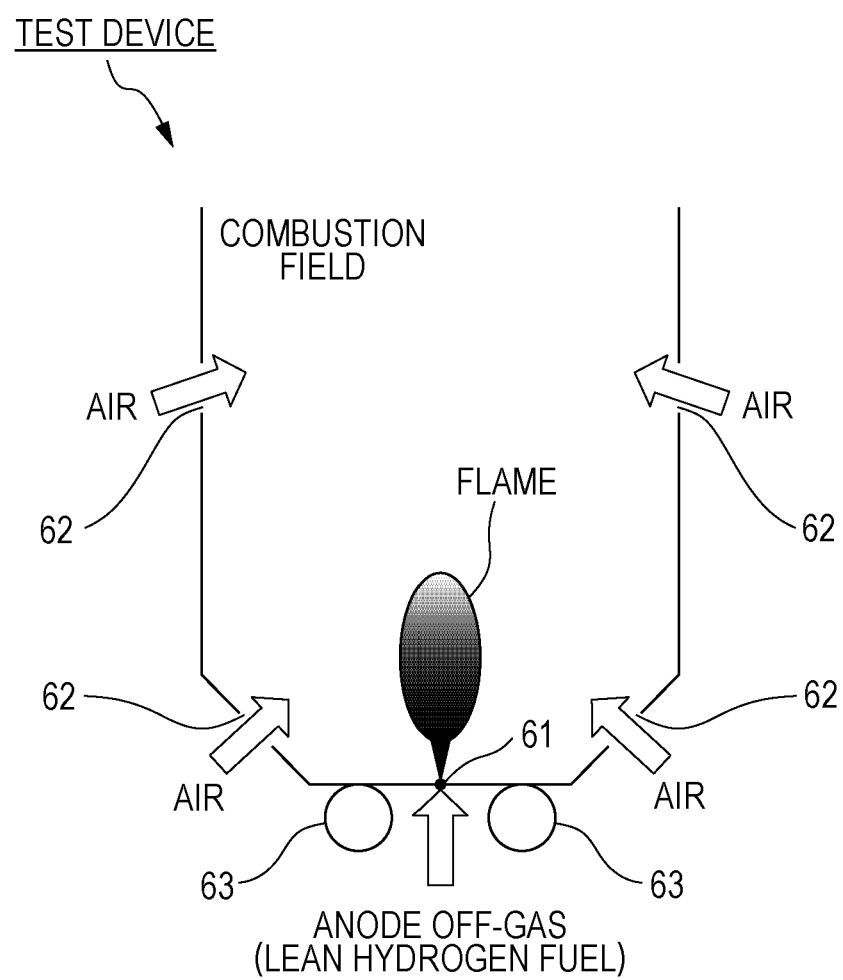
FIG. 1 is a schematic view of a cross-sectional structure of a test device for investigating the relationship between the anode off-gas temperature (fuel inlet temperature), which is the temperature of fuel (anode off-gas) jetted from nozzles, and the fuel's burning status in the combustion field of an SOFC system.

First, the inventors conducted a simulation experiment using a test device illustrated in FIG. 1, focusing on the relationship between the temperature of fuel (anode off-gas) jetted from nozzles (anode off-gas nozzles) 61 and the fuel's burning status in the combustion field of an SOFC system. FIG. 1 is a schematic view of a cross-sectional structure of a test device for investigating the relationship between the temperature of fuel (anode off-gas) jetted from nozzles 61 and the fuel's burning status in the combustion field of an SOFC system.

As illustrated in FIG. 1, the test device simulated the shape and configuration of an actual SOFC burner. To be more specific, the test device was a bowl-shaped or toroidal stainless-steel structure approximately 10 mm wide, 70 mm deep, and roughly 15 mm tall, and the combustion field was formed in the space surrounded by the side and bottom surfaces. There were multiple nozzles 61, round openings for introducing the fuel into the combustion field, in the bottom of the device, and multiple round openings 62 for introducing air into the combustion field in the sides of the device. It should be understood that the device illustrated in FIG. 1 has only one nozzle 61, but this is only for convenience in description. The actual test device had multiple nozzles 61.

In this experiment, hydrogen and nitrogen were mixed into a lean hydrogen fuel to simulate the anode off-gas of an SOFC operating with a fuel utilization (Uf) of 80%. The resulting lean hydrogen fuel was jetted upward from the bottom of the test device through the multiple nozzles 61 created in the device's bottom. Air as the cathode off-gas was jetted from the sides to the center of the combustion field through the multiple round openings 62 created in the sides of the test device to help the flames diffuse. In the combustion field, the anode and cathode off-gases were mixed by diffusion and burned. A comparative test was run assuming the best conditions for combustion (air ratio, λ=1.5; fuel jet velocity, 2.0 to 2.7 m/s).

In the comparative test, the temperature of the supply of lean hydrogen fuel and air was adjusted using heaters 63 placed beneath the combustion field of the test device (on the bottom of the device). The burning status was compared between three conditions: the temperature of fuel ejected from the nozzles 61 (anode off-gas temperature) was ordinary temperature (heaters 63 off), 300° C., and 600° C. The results were as presented in FIG. 2. FIG. 2 is a table comparing relationships between the anode off-gas temperature, which is the temperature of fuel (anode off-gas) ejected from the nozzles 61, and the fuel's burning status in the combustion field of the SOFC system.

As shown in FIG. 2, normal burning was maintained at an anode off-gas temperature of 600° C., which corresponds to the normal operating temperature of SOFCs. At the lower 300° C., some of the flames formed at the multiple nozzles 61 were lost. At ordinary temperature (heaters 63 off), the flames were unsteady and a partial extinguishment of flames was observed in the combustion field. The term "partial extinguishment of flames" refers to the state in which the flame was lost in one block (roughly one in four nozzles) or more of the multiple nozzles 61 in the test device.

The phenomenon indicated by the test results in FIG. 2 is common in simulated burning of gases using a diffusion combustor. Since the cause has yet to be identified, the approach currently taken to stabilize burning in an SOFC system is empirical: to configure the system so that the temperature of the combustion field can be maintained as high as possible. A specific measure for this is to tweak the arrangement of components in the SOFC system, such as allowing a certain clearance between heat absorbers (evaporator and reformer) and the combustion field.

Then, the inventors further investigated the burning of fuel in an SOFC system considering the nature of the diffusion combustion performed in the combustion field of such systems. To begin with, the following characteristics were assumed for the diffusion combustion in the combustor of an SOFC system: exposure of the combustion field to a high temperature (approximately 600° C.), water contained in the fuel to be burned, and lean-burn combustion.

As a study on the burning of fuel in a combustor considering the characteristics listed above, gases simulating anode and cathode off-gases were burned by diffusion combustion in a combustor, and a numerical analysis was performed using off-the-shelf software for thermal-hydraulic analysis. The boundary conditions were set according to the operating points of an actual SOFC. The specific SOFC operating conditions were as follows: equivalent of AC 700 W (rated); fuel utilization, 80%; air flow rate, 45 NLM; S/C=2.5.

Figure 3:
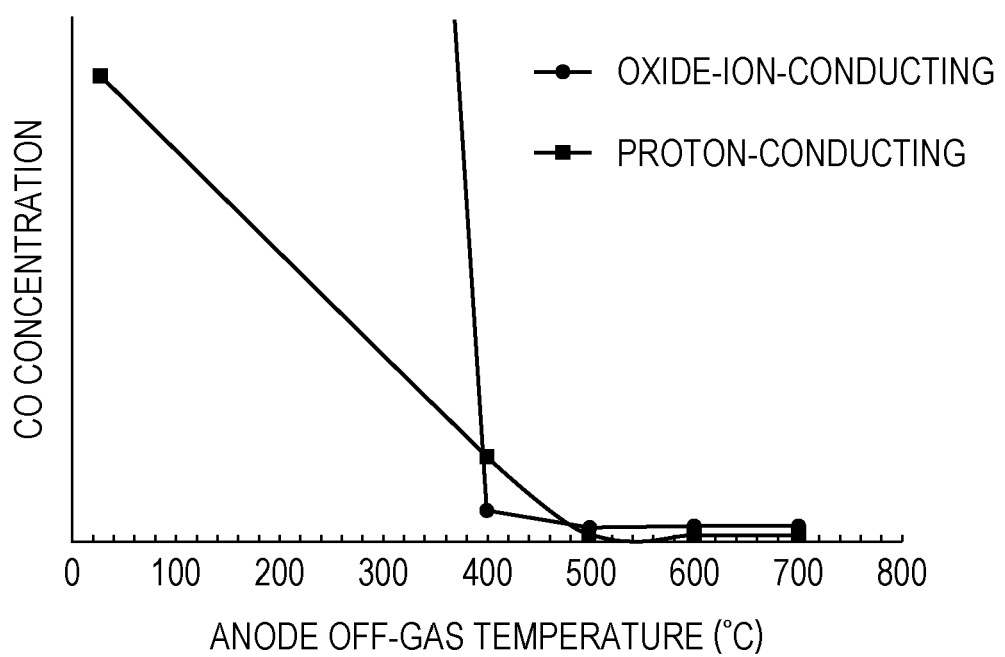
FIG. 3 is a graph illustrating examples of relationships between the anode off-gas temperature in the combustion field of SOFC systems and the concentration of CO in the exhaust gas.

First, the impact of changes in anode off-gas temperature on the burning status in the combustion field was numerically analyzed by seeing changes in the CO concentration in the exhaust gas while lowering the anode off-gas temperature from 700° C. (see FIG. 3). FIG. 3 is a graph illustrating examples of relationships between the anode off-gas temperature in the combustion field of SOFC systems and the concentration of CO in the exhaust gas. In FIG. 3, the black circles in the graph represent the relationship between the anode off-gas temperature and CO concentration for an SOFC system based on oxide-ion-conducting SOFCs, and the black solid squares that for an SOFC system based on proton-conducting SOFCs.

With the SOFC system based on oxide-ion-conducting SOFCs, the anode off-gas temperature in the combustion field was able be reduced from 700° C. to 500° C. without causing particular issues; the changes in CO concentration were minor, as shown in FIG. 3. At a lower anode off-gas temperature of 400° C., however, the flames formed in the combustion field became unsteady, and the CO concentration rose; CO emissions increased. Reducing the anode off-gas temperature to 200° C. resulted in the emission of much CO, indicating unsteady combustion reactions in the flames. These observations from a numerical analysis are consistent with the test results presented in FIG. 2.

With the SOFC system based on proton-conducting SOFCs, the anode off-gas temperature in the combustion field was able to be reduced from 700° C. to 500° C. without causing particular issues; the changes in CO concentration were minor, as shown in FIG. 3. However, a lowering from 500° C. to 400° C. increased the CO concentration gradually. That is, as the anode off-gas temperature was lowered from 500° C. to 400° C., the flames became unsteady, and CO emissions became larger accordingly. A lowering to ordinary temperature (27° C.) resulted in the emission of much CO, indicating unsteady combustion reactions in the flames.

Figure 4:
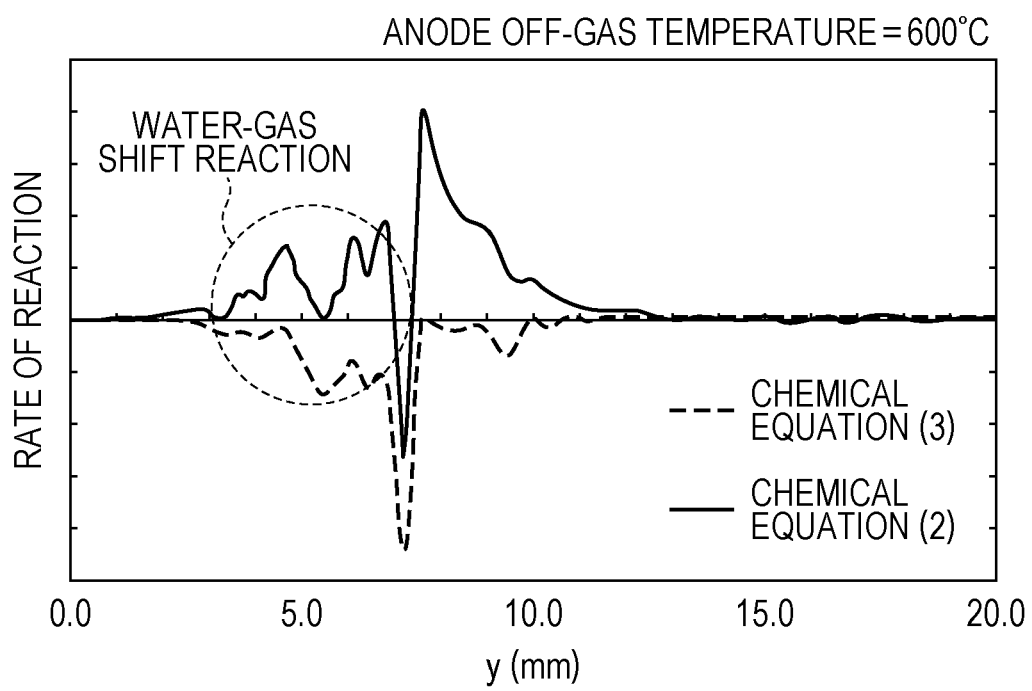
FIG. 4 is a graph illustrating an example of a distribution of reactions in a flame in the combustion field of an SOFC system.
Figure 5:
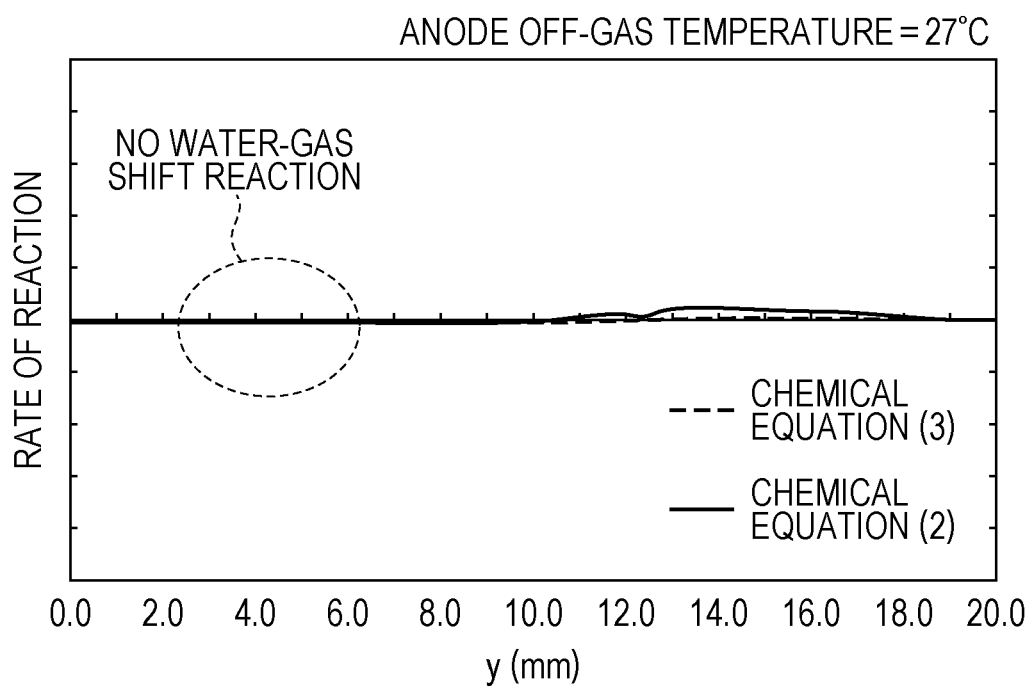
FIG. 5 is a graph illustrating an example of a distribution of reactions in a flame in the combustion field of an SOFC system.

To more clearly understand these relationships between the anode off-gas temperature and CO concentration (CO emissions) in the combustion field, the inventors analyzed chemical reactions occurring in the flames, based on a fuel cell system that uses a proton-conducting electrolyte in the cells (solid electrolyte cells). The results are presented in FIGS. 4 and 5. FIGS. 4 and 5 are graphs illustrating examples of distributions of reactions in a flame in the combustion field of the SOFC system.

Figure 6:
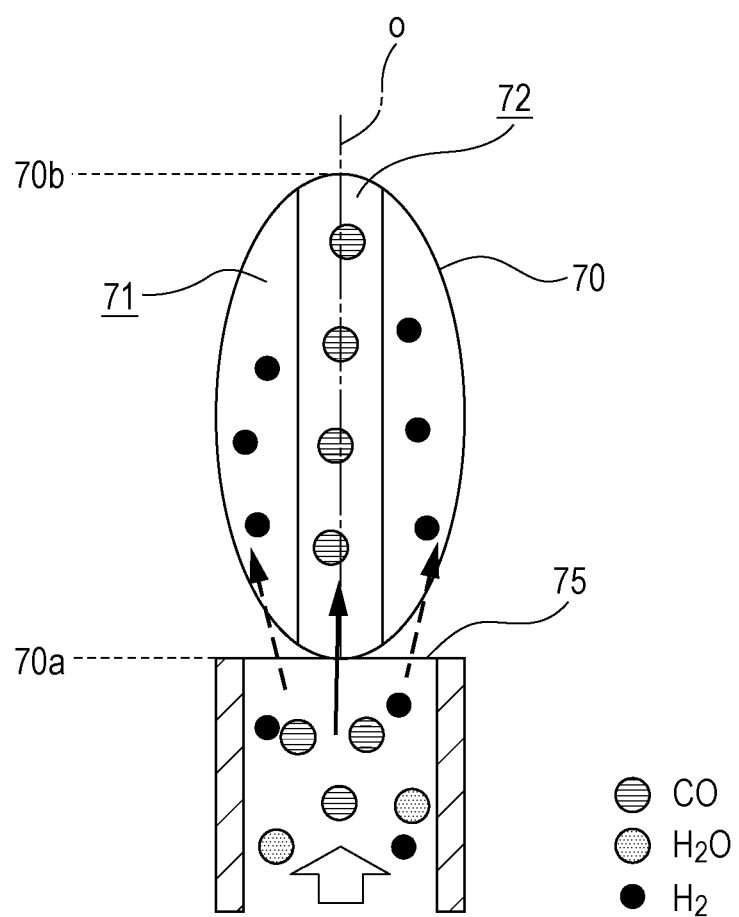
FIG. 6 is a schematic cross-sectional view of a flame in the combustion field of an SOFC system.

FIG. 4 illustrates the distribution of reactions in the flame at an anode off-gas temperature of 600° C., whereas FIG. 5 that at an anode off-gas temperature of 27° C. In FIGS. 4 and 5, the vertical axis represents the rate of reactions, specifically those of OH and CO, occurring in the flame. The broken line represents changes in the rate of reaction of OH, and the solid line changes in the rate of reaction of CO. The horizontal axis represents the distance from the proximal end 70a of the flame 70 in the direction of height (vertical direction) (see FIG. 6), extending in the direction from left to right in the drawing. As can be seen from FIG. 6, the distance from the proximal end 70a of the flame 70 in the direction of height is, in other words, the distance from the nozzle 75 along the central axis o of the flame 70, a flame resulting from igniting fuel jetted from the nozzle 75. FIG. 6 is a schematic cross-sectional view of a flame in the combustion field of the SOFC system. The cross-sectional flame is, as illustrated in FIG. 6, divided into a flame front region 71, which is a high-temperature region formed on the periphery of the flame 70, and a central region 72, contained in the flame front region 71. The point of the highest temperature along the central axis o in the cross-sectional flame is defined as the distal end 70b of the flame 70.

As shown in FIG. 4, when the anode off-gas temperature was 600° C., CO reacted the best at approximately 7.5 mm away from the proximal end 70a, or at the distal end 70b, of the flame 70. Between 4 and 6 mm from the proximal end 70a of the flame 70, the rate of reaction of OH changed in the negative direction, and that of CO in the positive. In this 4-6 mm range, therefore, the water-gas shift reaction (equation (1)) was observed, in which OH was produced (reverse reaction in equation (3)) while CO reacted with OH (forward reaction in equation (2)).

Water-gas shift reaction:

$$CO+H_2O \leftrightarrow CO_2+H_2 \quad (1)$$

$$CO+OH \leftrightarrow CO_2+H \quad (2)$$

$$OH+H_2 \leftrightarrow H_2O+H \quad (3)$$

That is, the phenomenon of combustion in an SOFC system, characterized by the features listed above (high temperature (approximately 600° C.), water in the fuel, and lean-burn combustion), involves OH production (reverse reaction in equation (3)) in the combustor, resulting from high-temperature decomposition of the water in the anode off-gas starting upon jetting of the anode off-gas, and the reaction of the resulting OH with CO (forward reaction in equation (2)) into $CO_2$ in the flames 70.

Moreover, reducing the anode off-gas temperature to 500° C. or below caused a sudden drop in the rate of the water-gas shift reaction occurring between 4 and 6 mm from the proximal end 70a of the flames 70. At ordinary temperature (anode off-gas temperature of 27° C.), as shown in FIG. 5, both CO and OH scarcely reacted.

As can be seen from these, the large CO emissions from an SOFC system are attributable to the inhibition of the water-gas shift reaction occurring between 4 and 6 mm from the proximal end 70a of the flames 70, and this inhibition is due to a decrease in anode off-gas temperature.

In addition, the analytical results have also revealed that in the combustion field of an SOFC system, CO, steam ($H_2O$), and $H_2$ move as illustrated in FIG. 6. As illustrated in FIG. 6, $H_2$, which gains high diffusibility with increasing temperature compared with other components of the anode off-gas jetting out of the nozzle 75, is attracted to the high-temperature flame front region 71. CO, stationary compared with $H_2$, goes up in the central region 72 along the central axis o of the flame 70. CO then turns into $CO_2$ in the central region 72 of the flame 70 through the water-gas shift reaction, and $H_2$ undergoes reaction in the flame front region 71 of the flame 70. Imaging of radicals has also confirmed such characteristics of the flames 70.

Overall, these studies demonstrated that the unsteady flames observed in the burning of a $H_2$/CO system are caused by a decrease in anode off-gas temperature. The aforementioned change in the state of flames associated with the presence or absence of the water-gas shift reaction would have remained unknown if the temperature of, for example, outer flames were detected as in the related art. Also, the inventors have found that burning in an SOFC system can be stabilized by switching the system from a controlled operation for power generation into an action for preventing failed combustion reactions when the anode off-gas temperature falls below a predetermined temperature.

These findings of the inventors had hitherto been unknown and incorporate a novel and significantly advantageous technical feature. The present disclosure, therefore, specifically provides the following aspects.

A solid oxide fuel cell system according to a first aspect of the present disclosure includes a fuel cell stack that generates electric power through a reaction between a fuel gas and an oxidizing gas; a combustor in which anode and cathode off-gases discharged from the fuel cell stack are burned by diffusion combustion; a temperature sensor that detects temperature of the anode off-gas flowing into the combustor; and a controller. While the solid fuel cell system is in power-generating operation and when the controller determines that the system is in at least one of the following states (i) and (ii), the controller instructs the system to perform a power-generation control action for preventing failed reactions in the diffusion combustion: (i) the temperature of the anode off-gas, detected by the temperature sensor, is below a first predetermined temperature for a predetermined continuous period of time; and (ii) the temperature of the anode off-gas decreases by not less than a predetermined second temperature range during a predetermined period of time.

The first predetermined temperature is a temperature by which the system can predict the potential of the temperature of the anode off-gas flowing into the combustor to reach a limit for unsteady burning and the emissions of CO and other fuel residues (hereinafter collectively "CO emissions"). The predetermined second temperature range, by which the anode off-gas temperature may fall during a predetermined length of time, represents a change per unit time in the temperature of the anode off-gas flowing into the combustor and is a temperature change by which the solid oxide fuel cell system can detect a decrease in anode off-gas temperature associated with a failure occurring therein.

In this configuration, the controller can predict the potential for unsteady burning and CO emissions by the anode off-gas temperature. The temperature sensor gives the controller the capability to know the temperature of the anode off-gas flowing into the combustor.

Moreover, the controller instructs a power-generation control action for preventing failed reactions in the diffusion combustion when it determines that the system is in at least one of the following states: the anode off-gas temperature is below a first predetermined temperature for a predetermined continuous period of time; the temperature of the anode off-gas decreases by not less than a predetermined second temperature range during a predetermined period of time.

The controller, therefore, regulates the solid oxide fuel cell system to limit the concentration of CO emitted therefrom, before unsteady burning and CO emissions.

As a result, the solid oxide fuel cell system according to a first aspect of the present disclosure is highly reliable owing to reduced failed reactions in combustion during power generation.

A solid oxide fuel cell system according to a second aspect of the present disclosure is: in the first aspect, the power-generation control action, instructed by the controller, may be at least one of the followings: reducing the fuel utilization in the fuel cell stack, reducing the flow rate of the oxidizing gas fed to the fuel cell stack, and reducing the output of the fuel cell stack.

In this configuration, the power-generation control action the controller orders can be to reduce the fuel utilization in the fuel cell stack. To reduce the fuel utilization, the controller may instruct the system to increase the flow rate of the fuel gas fed to the fuel cell stack. Alternatively, the controller may reduce the output of the fuel cell stack. Either will increase the hydrogen concentration of the anode off-gas, thereby raising the temperature of the flame in the diffusion combustion.

As another option, the power-generation control action the controller orders can be to reduce the flow rate of the oxidizing gas fed to the fuel cell stack. This will increase the overall temperature of the solid oxide fuel cell system, thereby raising the temperature of the flame and anode off-gas.

As yet another, the power-generation control action the controller orders can be to reduce the output of the fuel cell stack. Reducing the output power will reduce the use of $H_2$ for power generation, increasing the concentration of $H_2$ in the anode off-gas. As a result, the temperature of the flame is raised.

The controller instructs the system to perform at least one of these power-generation control actions, and the action(s) will increase the temperature of the flame. This promotes the water-gas shift reaction in the flame, limiting the concentration of CO emitted.

A solid oxide fuel cell system according to a third aspect of the present disclosure is: in the first or second aspect, the power-generation control action, instructed by the controller, may be at least one of the followings: reducing the fuel utilization in the fuel cell stack and reducing the output of the fuel cell stack.

A solid oxide fuel cell system according to a fourth aspect of the present disclosure is: in any one of the first to third aspects, the controller may instruct the system to stop the power-generation control action and switch to OCV operation, in which the fuel cell stack does not generate power but remains fed with the fuel and oxidizing gases, when the controller determines, during the power-generation control action, that the temperature of the anode off-gas is below a third predetermined temperature, set lower than the first predetermined temperature, for a predetermined continuous period of time.

The third predetermined temperature can be the temperature of the anode off-gas flowing into the combustor below which burning is unsteady and the CO emissions increase.

In this configuration, the controller instructs the system to switch to OCV operation when it determines, during the power-generation control action, that the anode off-gas temperature is below the third predetermined temperature for a predetermined period of time. In the OCV operation, the anode off-gas discharged from the fuel cell stack has an even higher hydrogen concentration than during the power-generation control action because it contains the $H_2$ that should have been used for power generation. As a result, the temperature of the flame is raised from that during the power-generation control action.

That is, in the event of a further decrease in the temperature of the anode off-gas flowing into the combustor down to the level below which CO emissions increase, the system in this configuration switches to OCV operation to further raise the temperature of the flame. This promotes the water-gas shift reaction of CO, limiting the CO emissions in the exhaust gas.

A solid oxide fuel cell system according to a fifth aspect of the present disclosure is: in any one of the first to third aspects, the fuel cell stack may include a plurality of solid electrolyte cells each having a proton-conducting electrolyte.

A solid oxide fuel cell system according to a sixth aspect of the present disclosure is: in the fourth aspect, the third predetermined temperature may be 400° C.

A solid oxide fuel cell system according to a seventh aspect of the present disclosure is: in the fourth aspect, the third predetermined temperature may be 500° C.

A solid oxide fuel cell system according to an eighth aspect of the present disclosure is: in the fourth aspect, the controller may instruct the system to shut off when the controller determines, during the OCV operation, that the temperature of the anode off-gas is below a fourth predetermined temperature, set lower than the third predetermined temperature, for a predetermined continuous period of time.

A solid oxide fuel cell system according to a ninth aspect of the present disclosure is: in the eighth aspect, the fourth predetermined temperature may be 200° C.

A solid oxide fuel cell system according to a tenth aspect of the present disclosure is: in any one of the first to ninth aspects, the temperature sensor may be in the vicinity of the fuel cell stack and detect direct or indirect information on the temperature of the anode off-gas flowing into the combustor.

The direct information on the temperature of the anode off-gas is information about the temperature of the anode off-gas itself. The indirect information is a measure linked to the temperature of the anode off-gas, for example the temperature of the fuel cell stack.

A solid oxide fuel cell system according to an eleventh aspect of the present disclosure is: in any one of the first to tenth aspects, the power-generating operation may be a controlled operation for startup power generation, which is an operation that the system performs after a startup controlled operation and before the temperature of the fuel cell stack reaches a level at which the system can generate electricity to an extent that an external load can be powered steadily, and in which the system warms the fuel cell stack by taking out an amount of electricity smaller than the rated power and thus producing heat associated with power generation in the fuel cell stack.

The following describes embodiments of the present disclosure with reference to drawings.

Embodiments

Structure of an SOFC System

Figure 7:
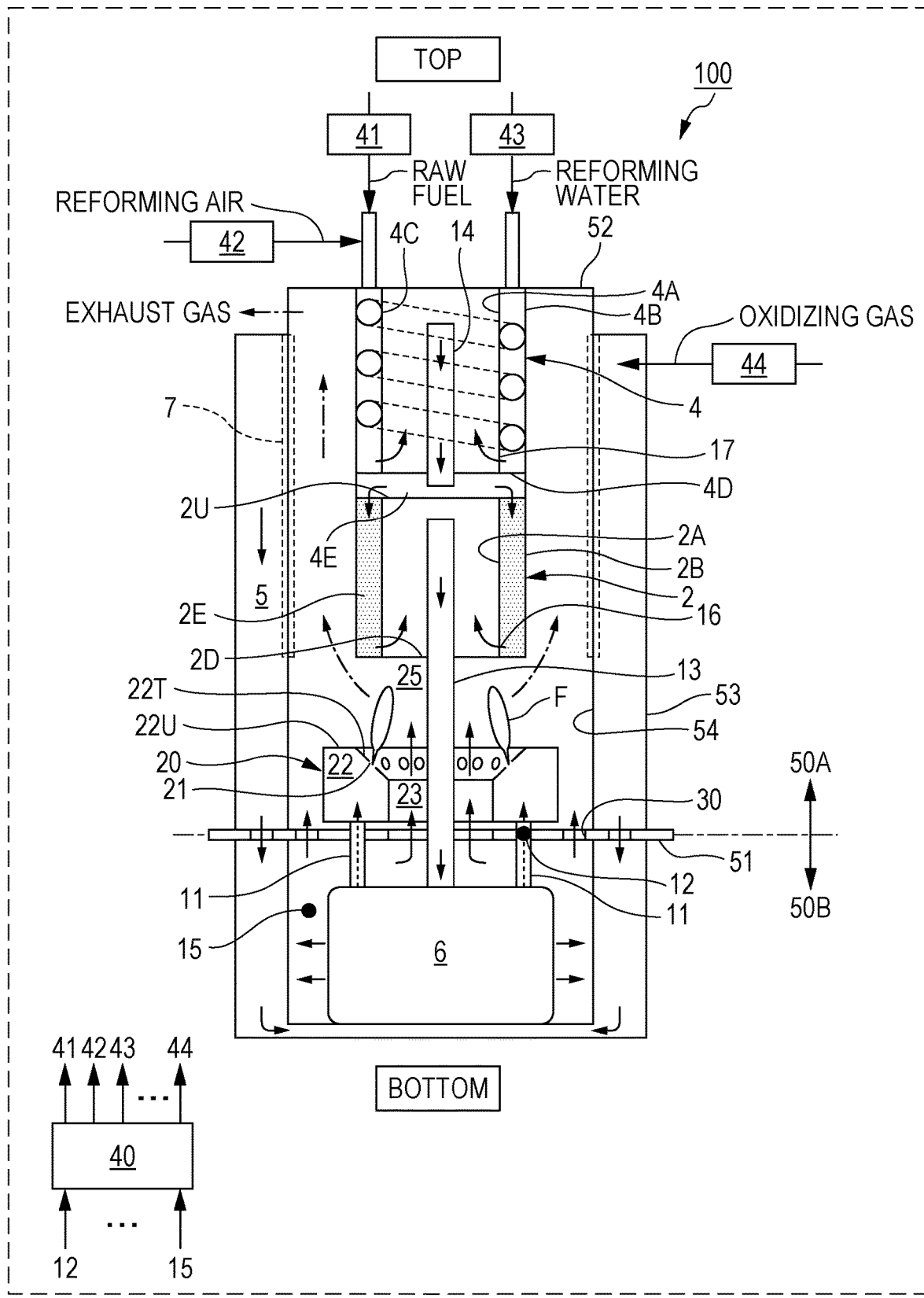
FIG. 7 illustrates an example of an SOFC system according to an embodiment of the present disclosure.

The structure of an SOFC system 100 according to an embodiment of the present disclosure is described with reference to FIG. 7. FIG. 7 illustrates an example of an SOFC system 100 according to an embodiment of the present disclosure. For the sake of description, the directions "TOP" and "BOTTOM" in FIG. 7 are defined as the top and bottom of the system (the same applies throughout). The gravity acts from top to bottom.

In the example illustrated in FIG. 7, the SOFC system 100 includes a reformer 2, an evaporator 4, an oxidizing gas feed path 5, an SOFC stack (fuel cell stack) 6, an oxidizing gas heat exchanger 7, anode off-gas discharge paths 11, a reformate gas feed path 13, a mixture feed path 14, a combustor 20, a first cathode off-gas passage 23, a second cathode off-gas passage 30, a controller 40, a raw fuel feeder 41, an air feeder 42, a water feeder 43, and an oxidizing gas feeder 44.

The SOFC system 100 according to this embodiment also has a separator 51, which divides the inside of the SOFC system 100 into an upper section 50A and a lower section 50B. The upper section 50A contains components such as the reformer 2, evaporator 4, and combustor 20, whereas the lower section 50B contains components such as the SOFC stack 6.

The reformer 2 reforms a hydrocarbon-based raw fuel into a reformate gas containing hydrogen. The reformer 2 in this embodiment is above the combustor 20 and has a side wall formed by an inner wall 2A and an outer wall 2B, but this is not the only possible configuration.

A reformer 2 having a side wall, however, transmits the heat of the exhaust gas efficiently throughout the reforming catalyst 2E filling the side wall of the reformer 2, as long as the thickness of the side wall is appropriate. In the SOFC system 100 according to this embodiment, the distance between the inner wall 2A and outer wall 2B (i.e., thickness of the side wall) can be, for example, approximately 10 mm so that the reformer 2 will contain a required amount of reforming catalyst 2E (e.g., approximately 200 g) while transmitting the heat of the exhaust gas throughout the reforming catalyst 2E sufficiently. Note that this specific example of a reformer 2 is for illustration purposes and does not represent the only possible configuration.

Moreover, the inner wall 2A and outer wall 2B of the reformer 2 do not need to be cylinders with different diameters as in the SOFC system 100 according to an embodiment. For example, the inner wall 2A and outer wall 2B may be rectangular tubes with different sizes.

Cylindrical inner and outer walls 2A and 2B of the reformer 2 as in the SOFC system 100 according to an embodiment, however, can be produced with a shorter length and fewer points of welding than those formed by rectangular tubes, helping reduce the cost of production of the reformer 2. Resistant to gas pressure and thermal stress compared with rectangular tubes, cylindrical inner and outer walls 2A and 2B of the reformer 2 can be thin. The cylindrical geometry therefore helps reduce the overall cost of production of the SOFC system 100.

In the SOFC system 100 according to an embodiment, the upper end of the side wall of the reformer 2 is covered with an upper plate 2U, and the lower end of the side wall with a lower plate 2D. The upper plate 2U has multiple openings (not illustrated) in its edge for sending gas to the reforming catalyst 2E.

As illustrated in FIG. 7, high-temperature exhaust gas passes through the space between the outer wall 2B of the reformer 2 and the inner wall 54 of the enclosure of the SOFC system 100. The reforming catalyst 2E in the reformer 2 is therefore heated by the heat of the exhaust gas.

The inner wall 2A of the reformer 2 has a turnaround section 16 near its lower end. The turnaround section 16 has multiple openings (not illustrated) created along the inner wall 2A. These openings are created in the inner wall 2A to such a size that the particles of the reforming catalyst are blocked, whereas the reformate gas is allowed to pass through (e.g., round holes approximately 1 to 3 mm across).

A reformate gas feed path 13 runs through the lower plate 2D airtightly, extending upward inside the reformer 2. The upper end of the reformate gas feed path 13 is positioned lower than the upper plate 2U and at a level where the reformate gas can flow smoothly from the inside of the reformer 2 into the reformate gas feed path 13. The lower end of the reformate gas feed path 13 is connected to the SOFC stack 6.

The reforming process performed in the reformer 2 can be in any form. Examples include steam reforming, autothermal reforming, and partial oxidation. As for the reforming catalyst, it is generally possible to use at least one catalytic metal selected from the group consisting of noble metal catalysts, such as Pt, Ru, and Rh, and of Ni. Although not illustrated in FIG. 7, the system may include any equipment necessary for the reforming process. For example, steam reforming involves equipment such as a water feeder 43 (e.g., pump) for supplying water to the evaporator 4. In the case of autothermal reforming, the SOFC system 100 includes equipment such as an air feeder 42 (e.g., blower) for supplying reforming air to the reformer 2.

The raw fuel sent to the reformer 2 can be either a hydrocarbon-based raw fuel gas containing an organic compound formed at least by carbon and hydrogen, such as manufactured gas, natural gas, or LPG, or a liquid hydrocarbon fuel, such as an alcohol, a biofuel, or diesel.

In the SOFC system 100 according to an embodiment, the reformer 2 performs steam reforming. To be more specific, the steam and raw fuel gas are fed at a high temperature (approximately 400° C. to 700° C.) to the reformer 2. In the reformer 2, $H_2$, $CO_2$, and CO are formed through steam reforming inside layers of the reforming catalyst 2E, producing a reformate gas (fuel gas) composed of these three species, partially reformed gas, and steam. The reformate gas is supplied to the anode of the SOFC stack 6 through the reformate gas feed path 13. Right above the upper plate 2U of the reformer 2 is an evaporator 4.

The evaporator 4 has a side wall formed by an inner wall 4A and an outer wall 4B and also has a bottom portion 4E formed by the upper plate 2U of the reformer 2 and a lower plate 4D. The upper end of the side wall of the evaporator 4 is covered with the top panel 52 of the enclosure of the SOFC system 100, and the lower end of the side wall with the lower plate 4D. The side wall and bottom portion 4E of the evaporator 4 are therefore both hollow. Inside the side wall, a channel component 4C (e.g., wire) is wound around to form a spiral flow passage.

The outer wall 4B of the evaporator 4 and the outer wall 2B of the reformer 2 are part of the same tube. This helps reduce the number of components in the SOFC system 100.

The inner wall 4A and outer wall 4B of the evaporator 4 do not need to be cylinders with different diameters as in the SOFC system 100 according to this embodiment. For example, the inner wall 4A and outer wall 4B may be rectangular tubes with different sizes.

Cylindrical inner and outer walls 4A and 4B of the evaporator 4 as in the SOFC system 100 according to an embodiment, however, can be produced with a shorter length and fewer points of welding than those formed by rectangular tubes, helping reduce the cost of production of the evaporator 4. Resistant to gas pressure and thermal stress compared with rectangular tubes, cylindrical inner and outer walls 4A and 4B of the evaporator 4 can be thin. The cylindrical geometry therefore helps reduce the overall cost of production of the SOFC system 100.

As illustrated in FIG. 7, the high-temperature exhaust gas passes through the space between the outer wall 4B of the evaporator 4 and the inner wall 54 of the enclosure of the SOFC system 100. The inside of the side wall of the evaporator 4 is therefore heated by the heat of the exhaust gas.

The inner wall 4A of the evaporator 4 has a turnaround section 17 near its lower end. The turnaround section 17 has multiple openings (not illustrated) created along the inner wall 4A. A mixture feed path 14, a route for the mixture of raw fuel and steam to flow through, runs through the lower plate 4D airtightly, extending upward inside the evaporator 4. The upper end of the mixture feed path 14 is positioned lower than the top panel 52 and at a level where the mixture can flow smoothly from the inside of the evaporator 4 into the mixture feed path 14. The lower end of the mixture feed path 14 is positioned higher than the upper plate 2U and at a level where the mixture can flow smoothly from the inside of the bottom portion 4E of the evaporator 4 into the reforming catalyst 2E.

The evaporator 4 can have any configuration as long as it is in contact with the reformer 2. For example, the evaporator 4 and reformer 2 may be arranged in this order from top to bottom with the side wall of the evaporator 4 and that of the reformer 2 interconnecting with the bottom portion 4E of the evaporator 4 as in the SOFC system 100.

This placement of the evaporator 4 in contact with the reformer 2 simplifies the structure of the SOFC system 100. That is, the SOFC system 100 is structurally simpler when the evaporator 4 and reformer 2 are integral and aligned in the vertical direction than when, for example, the evaporator 4 and reformer 2 are separate from each other.

The SOFC stack 6 generates power using the reformate gas and an oxidizing gas. The cathode of the SOFC stack 6 is supplied with the oxidizing gas through an oxidizing gas feed path 5, and the anode of the SOFC stack 6 with the reformate gas through the reformate gas feed path 13. Inside the SOFC stack 6 are single SOFCs (not illustrated), for example multiple SOFCs connected in series. The SOFC stack 6 can be a stack of multiple flat-plate cells or an assembly of multiple cylindrical cells. In this embodiment, the SOFC stack 6 is a flat-plate stack formed by stacking flat-plate cells and other components such as interconnectors. The SOFC system 100 also includes electrodes (not illustrated) and other components for taking out the current generated by the SOFC stack 6. The structure of the SOFC stack 6 is the same as that of a typical SOFC and is not described in detail.

Around the SOFC stack 6 is a second temperature sensor 15 that detects the temperature of the SOFC stack 6. The second temperature sensor 15 can be positioned anywhere, either directly on the SOFC stack 6 or near the SOFC stack 6, as long as the temperature of the SOFC stack 6 can be detected therewith. The second temperature sensor 15 can be a thermocouple or a thermopile for example, and transmits the results of detection to the controller 40.

The oxidizing gas feed path 5 is a channel through which an oxidizing gas flows to be sent to the cathode of the SOFC stack 6. Specifically, an oxidizing gas is supplied to the oxidizing gas feed path 5 by an oxidizing gas feeder 44 (e.g., blower) and then sent to the SOFC stack 6. The oxidizing gas can be, for example, air.

The oxidizing gas feed path 5 is formed between the inner wall 54 and outer wall 53 of the enclosure of the SOFC system 100. The inner wall 54 extends from the top panel 52 of the enclosure of the SOFC system 100 to beneath the SOFC stack 6 and covers the bottom of the SOFCs 1. Since the SOFC 100 operates at a high temperature (e.g., 600° C. or above), the enclosure of the SOFC system 100 is commonly covered with a thermal insulator (not illustrated) to reduce heat emissions to the outside.

The anode off-gas discharge paths 11 are channels through which the anode off-gas discharged from the anode of the SOFC stack 6 flows. Specifically, the anode off-gas contains substances such as $H_2$ not used for power generation at the SOFC stack 6 and $H_2O$ (steam) either produced from $H_2$ during the power generation or added to the raw fuel, and this gas flows into the anode off-gas discharge paths 11. After passing through the anode off-gas discharge paths 11, the gas is sent to the combustor 20. In the SOFC system 100 according to an embodiment, the anode off-gas discharge paths 11 extend from the anode of the SOFC stack 6, run through the lower section 50B and separator 51, and reach the combustor 20. It should be understood that the illustrated two are not the only possible number of anode off-gas discharge paths 11. An anode off-gas discharge path 11 is equipped with a first temperature sensor 12 for detecting the temperature of the anode off-gas fed to the combustor 20. The first temperature sensor 12 can be a thermocouple or a thermopile for example, and transmits the results of detection to the controller 40.

The first temperature sensor 12 can be positioned anywhere of the anode off-gas discharge path 11 as long as the temperature of the anode off-gas fed to the combustor 20 can be detected therewith. For example, the first temperature sensor 12 may be near a nozzle created at the end of the anode off-gas discharge path 11 as an inlet for the anode off-gas to be jetted into the combustor 20. The first temperature sensor 12 is not limited to the anode off-gas discharge paths 11 and can be positioned anywhere it is able to detect the inlet temperature of the anode off-gas (anode off-gas temperature), such as the inner combustor 20 or a side of the combustor 20.

In this way, the SOFC system 100 according to an embodiment detects the temperature not of the wake flow of a flame or the flame itself as in the related art, but of the anode off-gas fed to the combustor 20 using a first temperature sensor 12 placed in an anode off-gas discharge path 11. That is, the SOFC system 100 according to an embodiment detects the temperature of the anode off-gas ejected from the combustor 20 (anode off-gas temperature).

A cathode off-gas discharge path is a channel through which the cathode off-gas discharged from the cathode of the SOFC stack 6 flows. Specifically, the oxidizing gas not used for power generation at the SOFC stack 6 (cathode off-gas) flows through this cathode off-gas discharge path and then is sent to the combustion chamber 25. In the SOFC system 100 according to this embodiment, the cathode off-gas discharge path is formed by the space inside the lower section 50B in which the SOFC stack 6 is housed, the first cathode off-gas passage 23, and the second cathode off-gas passage 30.

The oxidizing gas heat exchanger 7 exchanges heat between the oxidizing gas flowing through the oxidizing gas feed path 5 and the exhaust gas flowing inside the inner wall 54. In the oxidizing gas heat exchanger 7, therefore, the portion of the inner wall 54 exposed to the exhaust gas serves as the heat transfer surface. As a result, the oxidizing gas (air), initially at ordinary temperature and flowing down in the oxidizing gas feed path 5, is heated to a high temperature (e.g., approximately 600° C. to 700° C.) because of heat exchange with the exhaust gas flowing up inside the inner wall 54. The temperature of the oxidizing gas is then further raised by the heat of reaction produced by the internal reforming in the SOFC stack 6 to a level required for the SOFC stack 6 to initiate the reaction for power generation, and this heated oxidizing gas is supplied to the cathode of the SOFC stack 6 from beneath the housing of the SOFC stack 6. The exhaust gas is allowed to cool to an appropriate temperature (e.g., approximately 100° C. to 200° C.) before being discharged out of the SOFC system 100. The discharged exhaust gas may be sent to a heat exchanger (not illustrated) for making warm water for general purposes.

The combustor 20 jets the cathode and anode off-gases discharged from the SOFC stack 6 into the combustion chamber 25 and burns the gases in the combustion chamber 25 by diffusion combustion. In the SOFC system 100 according to this embodiment, the anode off-gas discharged from the SOFC stack 6 is fed to a toroidal combustor 20 and jetted into the combustion chamber 25 at a predetermined rate, and, at the same time, the cathode off-gas discharged from the SOFC stack 6 is blown out from around the combustor 20 into the combustion chamber 25. In the combustion chamber 25, the anode off-gas is ignited, meets the cathode off-gas blown out from around the combustor 20, and is burned together with it by diffusion combustion.

Specifically, the combustor 20 has an anode off-gas collector 22 in which the anode off-gas discharged from the anode of the SOFC stack 6 gathers. The anode off-gas collector 22 has multiple anode off-gas nozzles 21, through which the collected anode off-gas is jetted into the combustion chamber 25, and surrounds the first cathode off-gas passage 23, through which the cathode off-gas discharged from the cathode of the SOFC stack 6 passes.

In the SOFC system 100 according to this embodiment, the anode off-gas collector 22 is a hollow toroid as illustrated in FIG. 7. The space inside the toroid communicates with the lower section 50B via an opening created in the separator 51. In this embodiment, the space inside the toroid plus this opening is the first cathode off-gas passage 23. The separator 51 also has openings outside the circumference of the anode off-gas collector 22 and inside of the inner wall 54, and these openings constitute the second cathode off-gas passage 30.

In the first cathode off-gas passage 23, the cathode off-gas passes through the space inside the anode off-gas collector 22. The flames F formed at the anode off-gas nozzles 21, however, incline toward the reformate gas feed path 13. This may prevent the cathode off-gas from reaching the outer edges of the flames F.

As a solution to this, the SOFC system 100 according to this embodiment has a second cathode off-gas passage 30 outside the anode off-gas collector 22 for part of the cathode off-gas to pass through. By virtue of this configuration, the cathode and anode off-gases are mixed better than in the related art, even around the outer edges of the flames F. The improved mixing of the cathode and anode off-gases provides a further improvement in the efficiency of the combustor 20. In an exemplary configuration, roughly half the cathode off-gas discharged from the cathode of the SOFC stack 6 may pass through the second cathode off-gas passage 30.

The anode off-gas nozzles 21 are created in such a manner that the anode off-gas jetting upward from the anode off-gas nozzles 21 comes close to the cathode off-gas passing up through the first cathode off-gas passage 23. In other words, the anode off-gas collector 22 has a tapered surface 22T sloping down to the first cathode off-gas passage 23, and the anode off-gas nozzles 21 are in this tapered surface 22T.

In this way, the anode off-gas jetted from the anode off-gas nozzles 21 and the cathode off-gas 23 that has passed through the first cathode off-gas passage 23 are burned.

The anode off-gas collector 22 of the SOFC system 100 according to this embodiment is a toroid, but this is not the only possible shape. The anode off-gas collector 22 can be, for example, a rectangular ring.

A toroidal anode off-gas collector 22 as in the SOFC system 100 according to this embodiment, however, can be produced with a shorter length and fewer points of welding than that in the shape of a rectangular ring, helping reduce the cost of production of the anode off-gas collector 22. Resistant to gas pressure and thermal stress compared with rectangular tubes, a toroidal anode off-gas collector 22 can be thin. The toroidal geometry therefore helps reduce the overall cost of production of the SOFC system 100.

The controller 40 controls the components of the SOFC system 100 in various ways. The controller 40 includes, for example, a processor (e.g., MPU or CPU) and a storage unit (e.g., memory). The CPU or similar processor loads and runs programs stored in the memory, executing the control processes.

In the SOFC system 100 according to this embodiment, the controller 40 works by, for example, receiving the results of detection from the first temperature sensor 12 (detected information) and, on the basis of the detection results, switching the operation of the SOFC system 100 to a power-generation control action that prevents failed combustion reactions. Further details of the power-generation control action for the prevention of failed combustion reactions are given in a later section.

Change in Stack Temperature during Power Generation with the SOFC System

Figure 8:
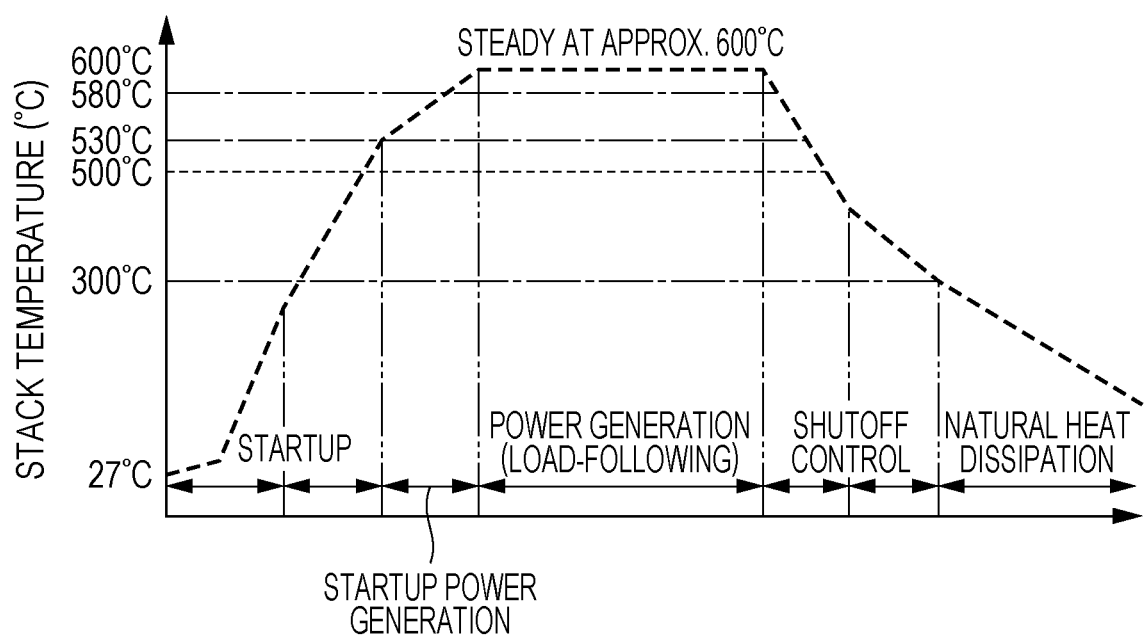
FIG. 8 illustrates an example of stack temperature changes during power generation for an SOFC system according to an embodiment of the present disclosure.

The following describes how the temperature of the SOFC stack 6 changes during the entire process of power generation performed by such an SOFC system 100, from startup to shutdown. FIG. 8 illustrates an example of stack temperature changes during power generation for an SOFC system 100 according to an embodiment of the present disclosure.

As illustrated in FIG. 8, to start up and generate power according to a load, the SOFC system 100 needs to be warmed from ordinary temperature (approximately 20° C.) to a temperature for stable power generation (600° C. to 800° C.). To be more specific, when the SOFC system 100 is in a startup controlled operation (operation mode is the startup control mode), the controller 40 operates the air feeder 42 and raw fuel feeder 41 (e.g., pressure boost pump) to introduce reforming air and a hydrocarbon raw fuel, such as manufactured gas, to the anode side of the SOFC stack 6 at ordinary temperature. That is, a raw fuel and reforming air are premixed, and the mixture is supplied to the anode of the SOFC stack 6 via the evaporator 4 and reformer 2. The controller 40 also operates the oxidizing gas feeder 44 to introduce air for power generation (oxidizing gas) to the cathode side. The controller 40 then operates an igniter (not illustrated) to light the anode off-gas discharged from the anode side of the SOFC stack 6, making it burn with the cathode off-gas discharged from the cathode side.

As the heat of combustion warms up the reformer 2 and raises its temperature, the partial oxidation (PDX) represented by chemical equation (4) proceeds. This partial oxidation (PDX) is exothermic and, therefore, allows the SOFC system 100 to start up well because the heat of reaction helps raise the temperature of the SOFC system 100. Even during the partial oxidation (PDX), the combustion reaction between the anode and cathode off-gases in the combustion chamber 25 continues.

$$C_mH_n + m/2O_2 \rightarrow mCO + n/2H_2 \qquad (4)$$

After a predetermined period of time following the start of the partial oxidation (PDX) or the reformer 2 has reached a preset temperature, the controller 40 operates the raw fuel feeder 41, air feeder 42, and water feeder 43 to supply a premix of raw fuel, reforming air, and steam produced by the evaporator 4 to the reformer 2. The reformer 2 performs autothermal reforming (ATR) as a combination of partial oxidation (PDX) and the steam reformation (SR) represented by chemical equation (5). This autothermal reforming (ATR) is thermally balanced and, therefore, proceeds in a thermally self-sustained manner in the reformer 2.

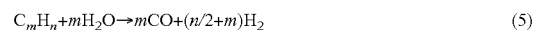

$$C_mH_n + mH_2O \rightarrow mCO + (n/2+m)H_2 \qquad (5)$$

After a predetermined period of time following the start of the autothermal reforming (ATR) or the reformer 2 has reached a preset temperature, the controller 40 operates the air feeder 42 to stop supplying reforming air. This changes the supply to the reformer 2 to a premix of the raw fuel and steam, switching the reaction from autothermal reforming (ATR) to steam reforming (SR). Although this steam reforming (SR) is endothermic, the temperature of the SOFC stack 6 increases steadily because at this point in time, the vicinity of the reformer 2 has been heated to a sufficiently high temperature (500° C. to 600° C.).

The temperature rise brings the temperature of the SOFC stack 6 to a predetermined temperature for power generation. The temperature for power generation is lower than the rated temperature of the stack, a temperature at which the stack generates power steadily under its rated load. Once the SOFC stack 6 has reached this power-generating temperature, the controller 40 operates a switch or similar component (not illustrated) to close the power-generating circuit including the SOFC stack 6. The SOFC stack 6 starts generating power, and an electric current flows through the power-generating circuit. As the process of power generation goes on, the cells and stack themselves heat up to an even higher temperature, raising the temperature of the SOFC stack 6 to its rated temperature. The rated temperature is between 600° C. and 800° C. for an oxide-ion-conducting SOFC, in which the electrolyte is a conductor of oxide ions, and approximately 600° C. for a proton-conducting SOFC, which uses a proton-conducting electrolyte. The predetermined temperature for power generation, lower than the rated temperature, is therefore between 500° C. and 700° C. and approximately between 500° C. and 550° C. for oxide-ion-conducting and proton-conducting SOFCs, respectively. Then, after the controller 40 determines that a temperature equal to or higher than the rated temperature can be maintained stably, the SOFC system 100 commences load-following operation (controlled operation for power generation). This state of being in load-following operation is referred to as normal operation.

Incidentally, as illustrated in FIG. 8, the particular period after the SOFC system 100 performs a startup controlled operation and before the temperature of the SOFC stack 6 reaches the level at which the system can generate electricity to an extent that an external load can be powered steadily (approximately 600° C.) is the stage of a controlled operation for startup power generation. The controlled operation for startup power generation is performed when the SOFC stack 6 is at temperatures of approximately 530° C. or above and below 600° C., and in this operation the system warms the fuel cell stack 6 by taking out an amount of electricity smaller than the rated power and thus producing heat associated with power generation in the cells. This means that during the controlled operation for startup power generation, the temperature of the SOFC stack 6 has yet to reach approximately 600° C. and is apt to fall. In the controlled operation for startup power generation, therefore, the anode off-gas temperature can be so low that the combustion reaction in the flames F is unsteady.

As a solution to this, the SOFC system 100 performs control for reducing failed reactions in combustion to prevent such unsteady combustion reaction in the flames F during power-generating operations in which the anode off-gas temperature can be low, such as the controlled operation for startup power generation.

Control for Reducing Failed Reactions in Combustion

Figure 9:
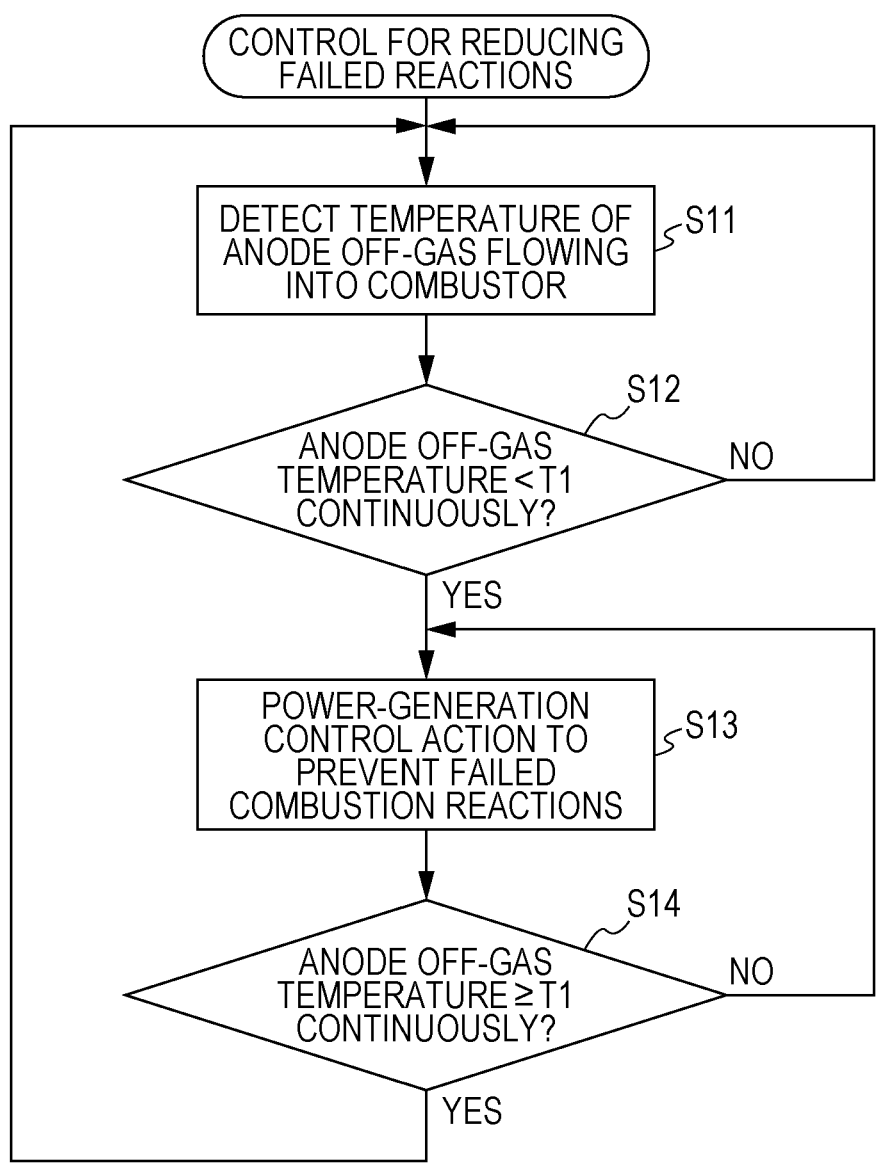
FIG. 9 is a flow chart illustrating an exemplary process of control for reducing failed reactions in combustion, for an SOFC system according to an embodiment of the present disclosure.

The following describes control processes whereby an SOFC system 100 with the above configuration reduces failed reactions in combustion that occur therein, with reference to FIG. 9. FIG. 9 is a flow chart illustrating an exemplary process of control for reducing failed reactions in combustion, for an SOFC system 100 according to an embodiment of the present disclosure. The control for reducing failed reactions in combustion may hereinafter be referred to simply as control for reducing failed reactions, or more simply as the control process.

As illustrated in FIG. 9, while the SOFC system 100 is generating power, the first temperature sensor 12 detects the temperature of the anode off-gas flowing into the combustor 20 (step S11). The controller 40 judges, on the basis of the results of detection given by the first temperature sensor 12, whether the detected temperature of the anode off-gas (anode off-gas temperature) has been below a first predetermined temperature T1 for a predetermined continuous period of time (step S12).

As discussed above, unsteady burning in the combustion chamber 25 and the resulting increase in the CO concentration of the exhaust gas occur when the anode off-gas temperature, or the temperature of the anode off-gas detected by the first temperature sensor 12, falls below a predetermined temperature (third predetermined temperature T2, detailed in a later section). To prevent this, the SOFC system 100 predicts the potential for unsteady burning in this step S12. The condition "for a predetermined continuous period of time" is intended to exclude cases in which the first temperature sensor 12 erroneously finds the anode off-gas temperature lower than the first predetermined temperature T1, for example because of a misdetection.

The first predetermined temperature T1 is therefore a temperature by which the system can predict the potential of the anode off-gas temperature to reach a limit for unsteady burning and the emissions of CO and other fuel residues (CO emissions). Specifically, the first predetermined temperature T1 is a temperature higher than the anode off-gas temperature at which unsteady burning and CO emissions occur. Additionally, the operating temperature of the SOFC system 100 fluctuates, for example as a result of disturbance or parameter changes, and the anode off-gas temperature also varies accordingly. The first predetermined temperature T1 is therefore set considering these changes in anode off-gas temperature.

If the controller 40 determines that the anode off-gas temperature detected by the first temperature sensor 12 is not below the first predetermined temperature T1 for a predetermined continuous period of time ("NO" in step S12), the system repeats the detection of the temperature of the anode off-gas with the first temperature sensor 12.

If the controller 40 determines that the anode off-gas temperature detected by the first temperature sensor 12 has been below the first predetermined temperature T1 for a predetermined continuous period of time ("YES" in step S12), the SOFC system 100 performs a power-generation control action for preventing failed combustion reactions, following instructions given by the controller 40 (step S13).

As long as the controller 40 determines that the anode off-gas temperature is not equal to or higher than the first predetermined temperature T1 for a predetermined continuous period of time ("NO" in step S14), the power-generation control action is continued. When the controller 40 finds that the anode off-gas temperature is equal to or higher than the first predetermined temperature T1 for a predetermined continuous period of time ("YES" in step S14), the system stops the power-generation control action and switches to power-generating operation, and the process returns to step S11.

The power-generation control action for preventing failed combustion reactions is to control the SOFC system 100 to promote the reaction of CO (water-gas shift reaction) in the central region of the flames F, for example by increasing the temperature of the flames F.

Figure 10:
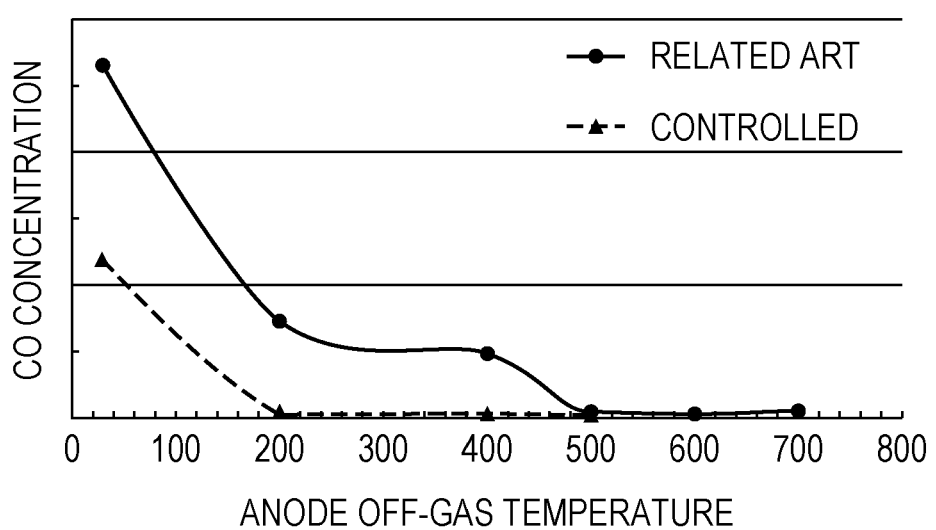
FIG. 10 is a graph illustrating an example of a relationship between the anode off-gas temperature and the CO concentration for an SOFC system according to an embodiment of the present disclosure, with or without control for reducing failed reactions in combustion.

With this capability of control for reducing failed reactions illustrated in FIG. 9, the SOFC system 100 according to an embodiment operates with fewer failures of the water-gas shift reaction in the central region of the flames F and, as FIG. 10 shows, produces less CO emissions even when the anode off-gas temperature is low. FIG. 10 is a graph illustrating an example of a relationship between the anode off-gas temperature and the CO concentration for an SOFC system 100 according to an embodiment of the present disclosure, with or without the control for the reduction of failed reactions. In FIG. 10, the vertical axis represents the CO concentration, with the CO concentration increasing from bottom to top. The horizontal axis represents the anode off-gas temperature (° C.), with the temperature increasing from left to right in the drawing. The broken line represents the relationship between the CO concentration and anode off-gas temperature observed with control for the reduction of failed reactions, and the solid line that without the control. The data presented in FIG. 10 are from SOFC systems 100 having proton-conducting SOFCs.

At anode off-gas temperatures around 600° C., the SOFC stack 6 generates electricity to an extent that an external load can be powered steadily. As shown in FIG. 10, the CO concentration did not increase with or without the control for the reduction of failed reactions. As the anode off-gas temperature fell below 500° C., however, the CO concentration climbed in the system not controlled to reduce failed reactions. With the control, no rise in CO concentration was observed until the anode off-gas temperature was lower than 200° C. This process of control for reducing failed reactions, therefore, successfully promotes the water-gas shift reaction and limits CO emissions even in operation modes in which the temperature of the SOFC stack 6 is apt to fall, such as controlled operation for startup power generation.

Variation 1

Figure 11:
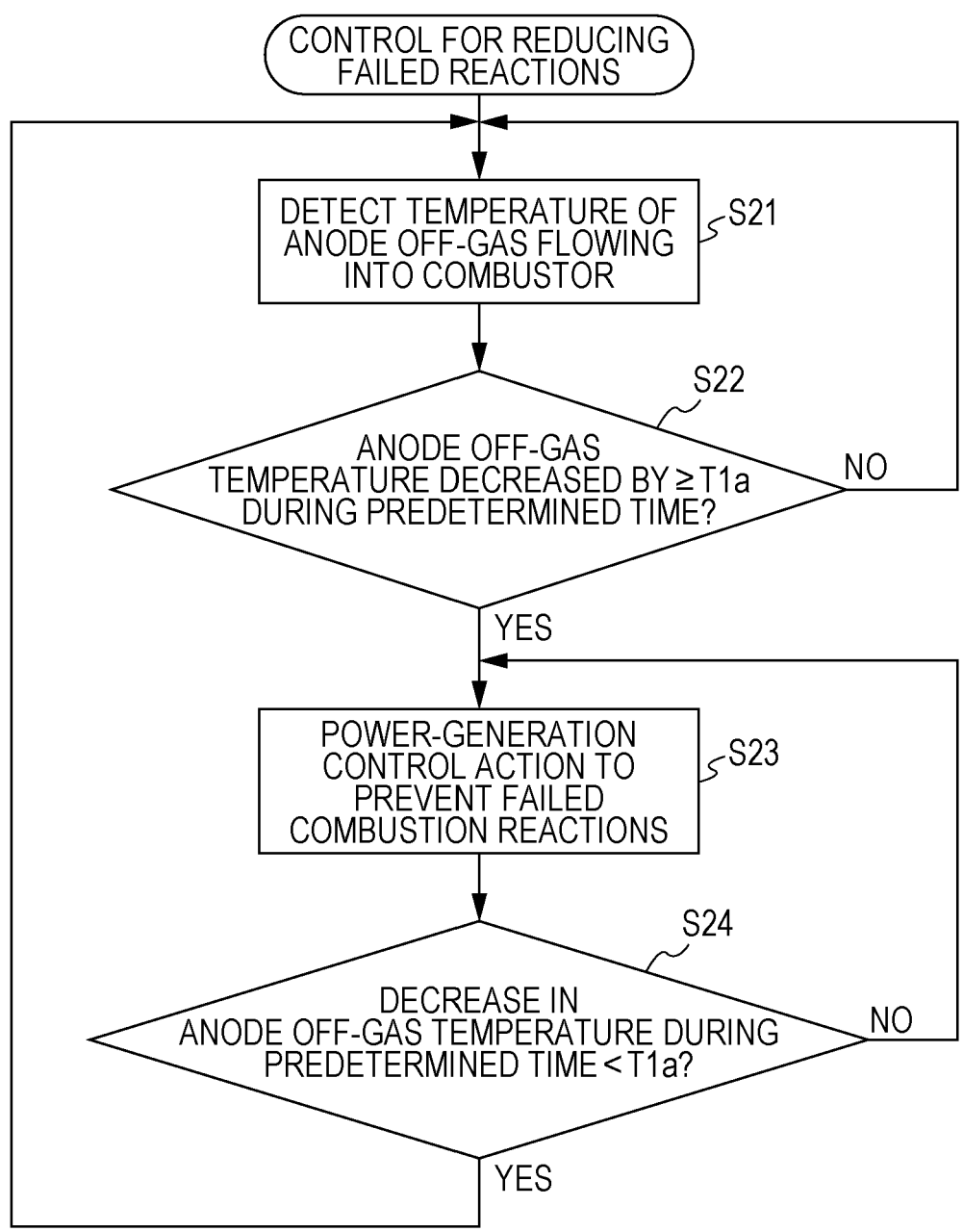
FIG. 11 is a flow chart illustrating an exemplary process of control for reducing failed reactions in combustion, for an SOFC system according to Variation 1 of an embodiment of the present disclosure.

The following describes Variation 1 of the control for reducing failed reactions in combustion with reference to FIG. 11. FIG. 11 is a flow chart illustrating an exemplary process of control for reducing failed reactions in combustion, for an SOFC system 100 according to Variation 1 of an embodiment of the present disclosure.

The control process according to Variation 1 of an embodiment, illustrated in FIG. 11, differs from that according to an embodiment, illustrated in FIG. 9, only in steps S22 and S24. The other steps are the same as in FIG. 9 and the following description is focused on steps S22 and S24.

In step S22, the controller 40 judges, on the basis of the results of detection given by the first temperature sensor 12, whether the detected temperature of the anode off-gas (anode off-gas temperature) has decreased by not less than a predetermined second temperature range T1$a$ during a predetermined period of time (step S22). For example, the controller 40 may judge whether the anode off-gas temperature has decreased by not less than a predetermined second temperature range T1$a$ (5° C.) during the predetermined period of 2 to 3 minutes. The predetermined period of time and predetermined second temperature range T1$a$ can be any values that represent a temperature change per unit time and by which the SOFC system 100 can detect a decrease in anode off-gas temperature associated with a failure occurring therein. The predetermined period of time and predetermined second temperature range T1$a$ may be set to appropriate values based on a historical temperature change per unit time during defective power-generating operation.

If the controller 40 determines that the anode off-gas temperature has not decreased by not less than the predetermined second temperature range T1$a$ during the predetermined period of time ("NO" in step S22), the system repeats the detection of the temperature of the anode off-gas with the first temperature sensor 12.

If the controller 40 determines that the anode off-gas temperature has decreased by not less than the predetermined second temperature range T1$a$ during the predetermined period of time ("YES" in step S22), the SOFC system 100 performs a power-generation control action for preventing failed combustion reactions, following instructions given by the controller 40 (step S23).

As long as the controller 40 determines that the decrease in anode off-gas temperature during the predetermined period of time is not smaller than the predetermined second temperature range T1$a$ ("NO" in step S24), the power-generation control action is continued. When the controller 40 finds that the decrease in anode off-gas temperature during the predetermined period of time is smaller than the predetermined second temperature range T1$a$ ("YES" in step S24), the system stops the power-generation control action and switches to power-generating operation, and the process returns to step S21.

In the control process according to Variation 1, step S22 involves the controller 40 judging whether the anode off-gas temperature decreases by T1$a$ or to a greater extent during a predetermined period of time and thereby determining whether to perform a power-generation control action for preventing failed combustion reactions. This, however, is not the only possible criterion in step S22. For example, the system may perform the power-generation control action when both the criterion in step S12, illustrated in FIG. 9, and that in step S22, illustrated in FIG. 11, are met.

Moreover, in the control process according to Variation 1, step S24 involves the controller 40 judging whether the decrease in anode off-gas temperature during the predetermined period of time is less than the predetermined second temperature range T1$a$ and thereby determining whether to stop the power-generation control action and switch to normal power-generating operation. This, however, is not the only possible criterion in step S24. For example, the system may stop the power-generation control action and switch to normal power-generating operation when both the criterion in step S14, illustrated in FIG. 9, and that in step S24, illustrated in FIG. 11, are met.

Variation 2

Figure 12:
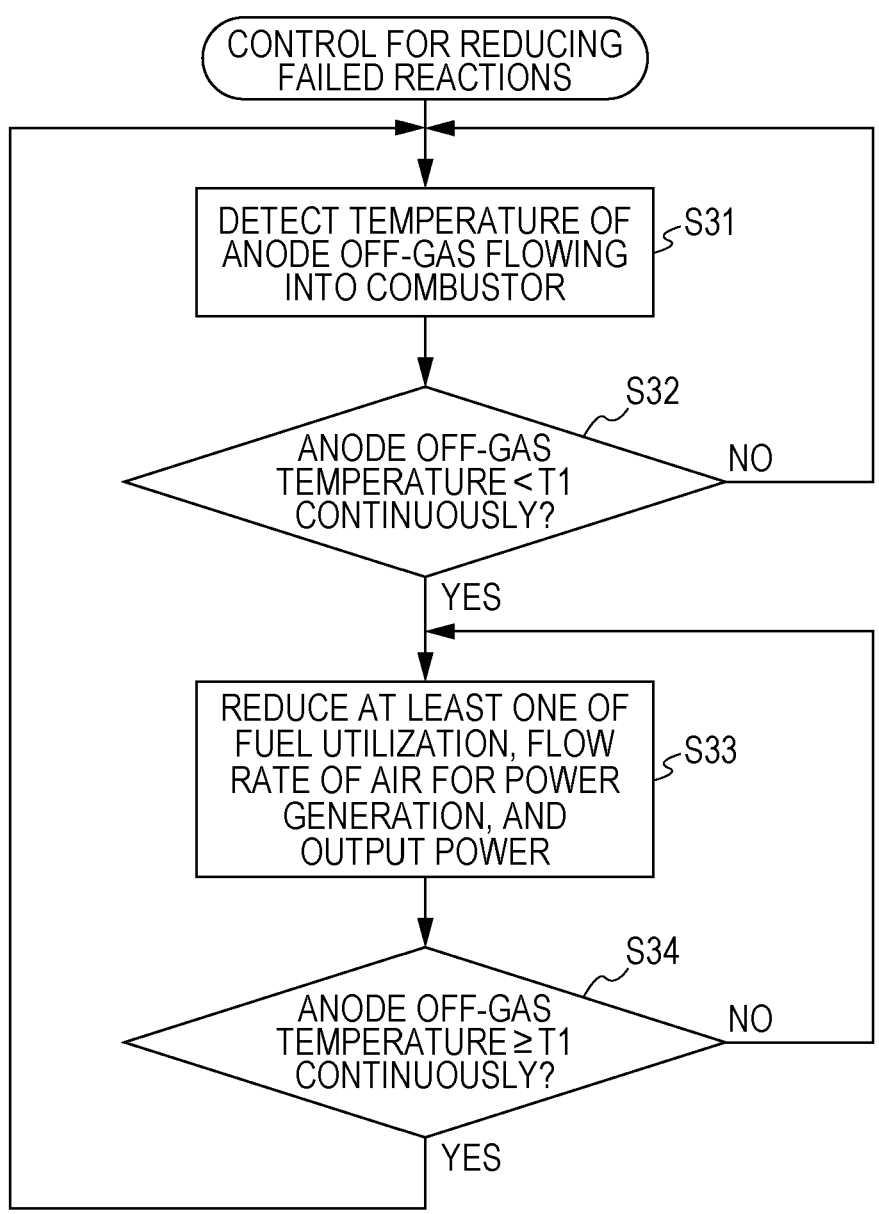
FIG. 12 is a flow chart illustrating an exemplary process of control for reducing failed reactions in combustion, for an SOFC system according to Variation 2 of an embodiment of the present disclosure.

The following describes Variation 2 of the control for reducing failed reactions in combustion with reference to FIG. 12. FIG. 12 is a flow chart illustrating an exemplary process of control for reducing failed reactions in combustion, for an SOFC system 100 according to Variation 2 of an embodiment of the present disclosure.

The control process according to Variation 2 of an embodiment, illustrated in FIG. 12, differs from that according to an embodiment, illustrated in FIG. 9, only in step S33. The other steps are the same as in FIG. 9 and the following description is focused on step S33.

Specifically, the SOFC system 100 according to Variation 2 differs in the power-generation control action for preventing failed combustion reactions, which the SOFC system 100 according to an embodiment performs in step S13. In step S33, the controller 40 instructs the system to reduce at least one of the following: the fuel utilization in the SOFC stack 6, the flow rate of the air for power generation (oxidizing gas), and the output of the SOFC stack 6.

That is, the controller 40 may instruct the raw fuel feeder 41 to increase the flow rate of the raw fuel it supplies, thereby reducing the fuel utilization in the SOFC stack 6. Alternatively, the controller 40 may instruct the system to reduce the output of the SOFC stack 6, thereby decreasing the use of the fuel (reformate gas). Reducing the fuel utilization will increase the $H_2$ concentration of the anode off-gas, raising the temperature of the flames F. The water-gas shift reaction will be promoted in the central region of the flames F, limiting the concentration of CO emitted.

As another option, the controller 40 may instruct the oxidizing gas feeder 44 to reduce the flow rate of the air for power generation (oxidizing gas) it supplies. Reducing the flow rate of the air for power generation (oxidizing gas) will increase the overall temperature of the SOFC system 100. The temperature of the flames F in the combustion chamber 25 will be raised, and so will the temperature of the anode off-gas jetted from the combustor 20 (anode off-gas temperature). The water-gas shift reaction will be promoted in the central region of the flames F, limiting the concentration of CO emitted.

As yet another, the controller 40 may instruct an inverter (not illustrated) regulating the generated electricity to lower the electricity taken out of the SOFC stack 6, thereby reducing the output of the SOFC stack 6. Reducing the output power will place the system under operating conditions with a lower fuel utilization, or a lower percentage use of $H_2$ for power generation. The concentration of $H_2$ in the anode off-gas will be increased, raising the temperature of the flames F. The water-gas shift reaction will be promoted in the central region of the flames F, limiting the concentration of CO emitted.

Variation 3

Figure 13:
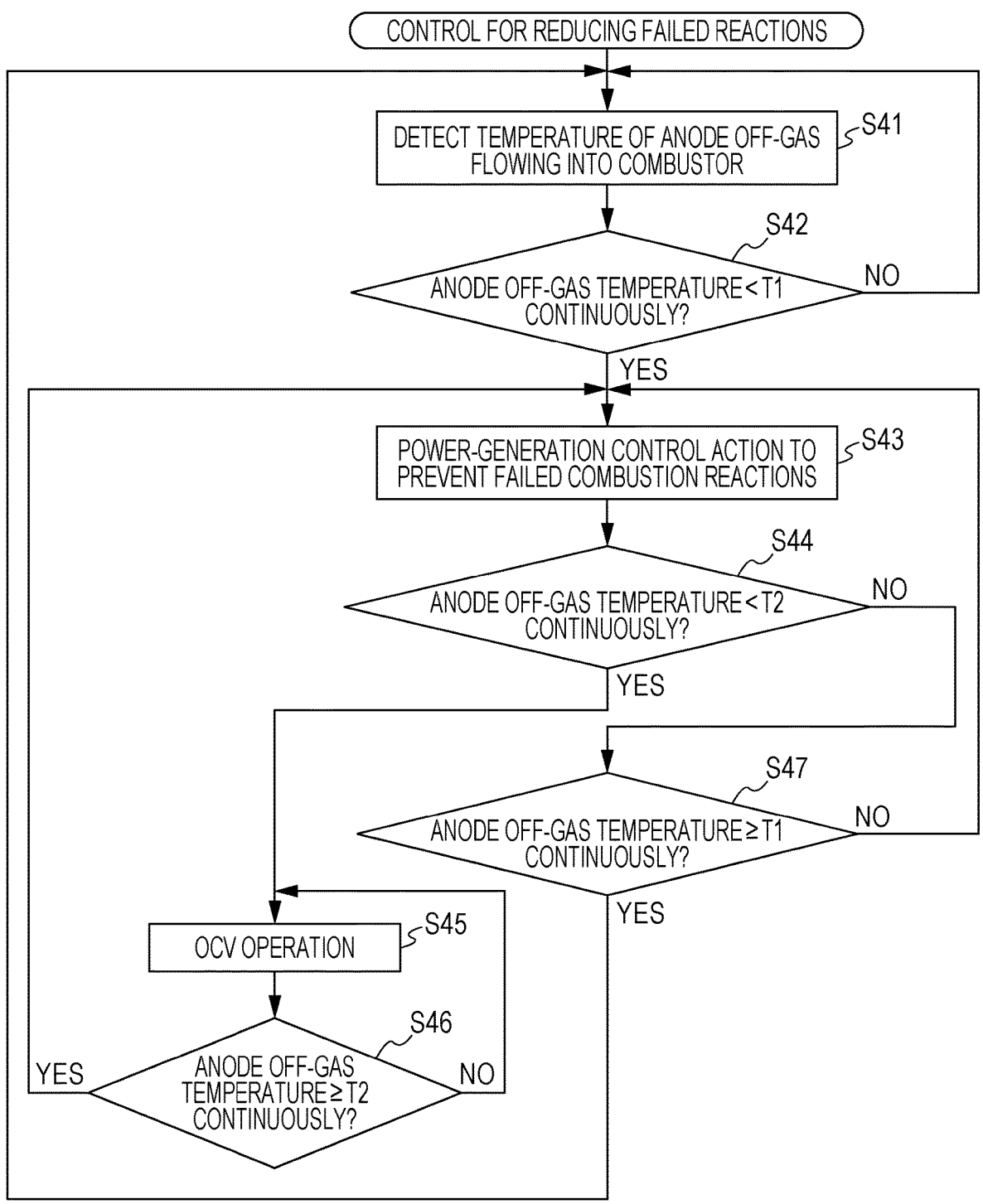
FIG. 13 is a flow chart illustrating an exemplary process of control for reducing failed reactions in combustion, for an SOFC system according to Variation 3 of an embodiment of the present disclosure.

The following describes Variation 3 of the control for reducing failed reactions in combustion with reference to FIG. 13. FIG. 13 is a flow chart illustrating an exemplary process of control for reducing failed reactions in combustion, for an SOFC system 100 according to Variation 3 of an embodiment of the present disclosure.

In the control process according to Variation 3, illustrated in FIG. 13, steps S41 to S43 and S47 are the same as steps S11 to S14 in that according to an embodiment, illustrated in FIG. 9. The following description does not detail these steps and discusses the new steps in Variation 3, S44 to S46.

While the SOFC system 100 is performing a power-generating action for preventing failed combustion reactions in step S43, the controller 40 judges whether the anode off-gas temperature detected by the first temperature sensor 12 is below a third predetermined temperature T2 for a predetermined continuous period of time (step S44). The third predetermined temperature T2 is lower than the first predetermined temperature T1 and can be the temperature of the anode off-gas below which burning is unsteady and the emissions of CO and other fuel residues (CO emissions) increase. Alternatively, the third predetermined temperature T2 can be an anode off-gas temperature at which the power-generation control action fails to reduce CO emissions. Further details of the third predetermined temperature T2 are given in a later section.

If the controller 40 determines that the anode off-gas temperature is not below the third predetermined temperature T2 for a predetermined continuous period of time ("NO" in step S44), the process goes to step S47, and the controller 40 judges whether the anode off-gas temperature is equal to or higher than the first predetermined temperature T1 for a predetermined continuous period of time. If the controller 40 determines that the anode off-gas temperature is equal to or higher than the first predetermined temperature T1 for the predetermined continuous period of time ("YES" in step S47), the system stops the power-generation control action and switches to normal power-generating operation, and the process returns to step S41. If "NO" in step S47, the power-generation control action is continued.

If, in step S44, the controller 40 determines that the anode off-gas temperature is below the third predetermined temperature T2 for the predetermined continuous period of time ("YES" in step S44), the system is switched to what is called OCV (open circuit voltage) operation (stand-by operation) (step S45). In OCV operation, the SOFC stack 6 remains fed with the fuel (reformate gas), oxidizing gas, and any other necessary material and continues generating power with its power-generating circuit open and under no electric load.

While the SOFC system 100 is in OCV operation, the controller 40 judges whether the anode off-gas temperature is equal to or higher than T2 for a predetermined continuous period of time (step S46). If the controller 40 determines that the anode off-gas temperature is equal to or higher than T2 for the predetermined continuous period of time ("YES" in step S46), the process returns to step S43, and the SOFC system 100 switches from OCV operation to the power-generation control action for preventing failed combustion reactions, following instructions given by the controller 40.

If the controller 40 determines that the anode off-gas temperature is not equal to or higher than T2 for the predetermined continuous period of time ("NO" in step S46), the process returns to S45, and the OCV operation is continued.

The anode off-gas temperature may, in some cases, continue decreasing and reach such a level that the power-generation control action for preventing failed combustion reactions no longer helps limit CO emissions. Even in such a case, the control process according to Variation 3 successfully limits CO emissions by switching the system to OCV operation. This control process, in other words, successfully raises the temperature of the central region of the flames F, promotes the water-gas shift reaction, and limits CO emissions even if the anode off-gas temperature falls so low that the power-generation control action fails to limit CO emissions.

It should be noted that in the control process according to Variation 3, step S42 may be replaced with step S21 of Variation 1, illustrated FIG. 11; the controller 40 may judge whether the anode off-gas temperature decreases by not less than T1a during a predetermined period of time. Alternatively, the controller 40 may assess whether both the criterion in step S42 and that in step S21 are met. Moreover, step S47 may be replaced with step S24 of Variation 1, illustrated FIG. 11; the controller 40 may judge whether the decrease in anode off-gas temperature during the predetermined period of time is less than T1a. Alternatively, the controller 40 may assess whether both the criterion in step S47 and that in step S24 are met.

In the control process according to Variation 3, furthermore, the power-generation control action for preventing failed combustion reactions, performed in step S43, may be as in step S34 of the control process according to Variation 2. That is, the controller 40 in this step may instruct the system to reduce at least one of the fuel utilization in the SOFC stack 6, the flow rate of the air for power generation (oxidizing gas), and the output of the SOFC stack 6.

Variation 4

Figure 14:
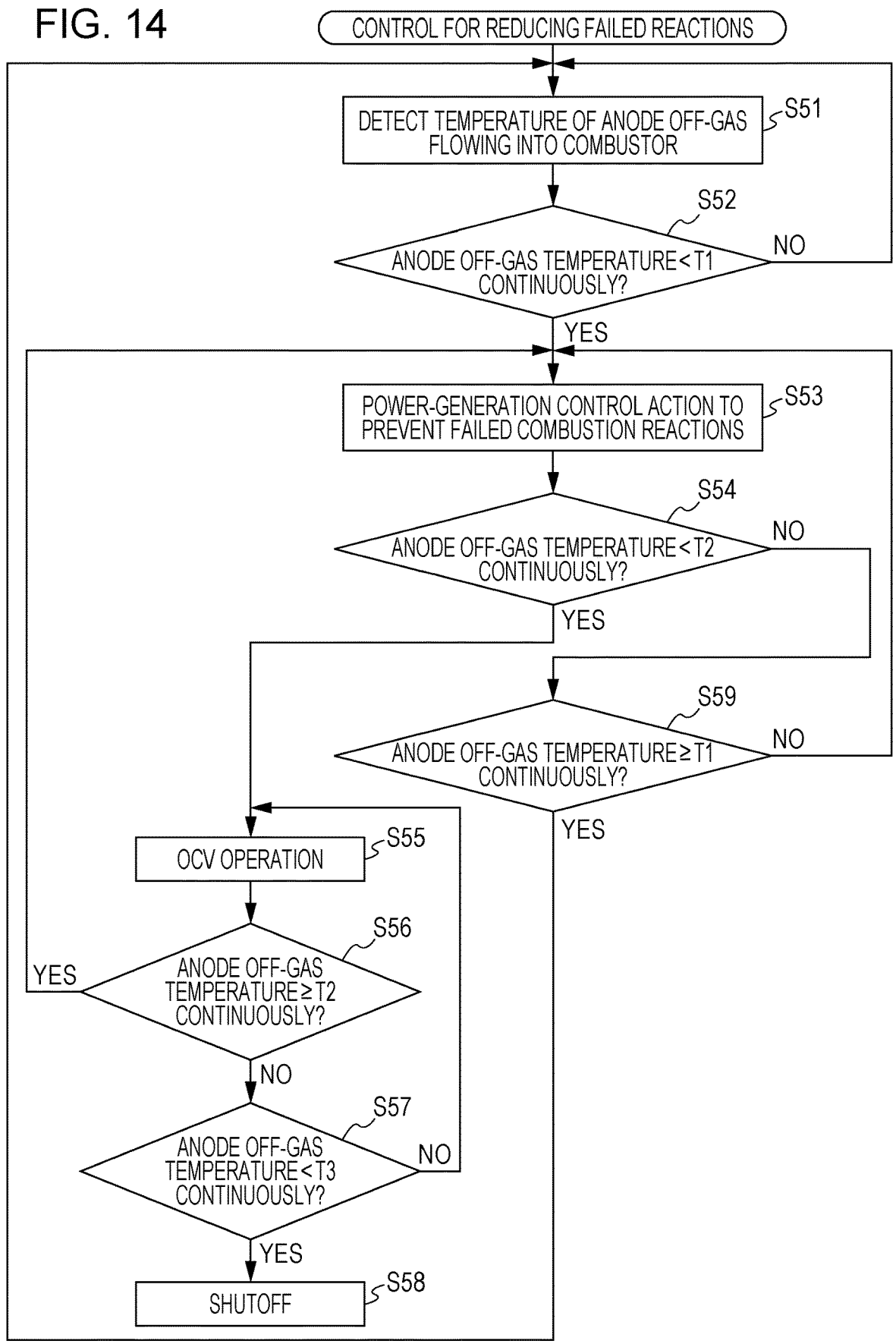
FIG. 14 is a flow chart illustrating an exemplary process of control for reducing failed reactions in combustion, for an SOFC system according to Variation 4 of an embodiment of the present disclosure.

The following describes Variation 4 of the control for reducing failed reactions in combustion with reference to FIG. 14. FIG. 14 is a flow chart illustrating an exemplary process of control for reducing failed reactions in combustion, for an SOFC system 100 according to Variation 4 of an embodiment of the present disclosure.

In the control process according to Variation 4, illustrated in FIG. 14, steps S51 to S56 and S59 are the same as steps S41 to S47 in that according to Variation 3, illustrated in FIG. 13. The following description does not detail these steps and discusses the new steps in Variation 4, S57 and S58.

If the controller 40 determines, while the SOFC system 100 is in OCV operation, that the anode off-gas temperature is not below the third predetermined temperature T2 for a predetermined continuous period of time ("NO" in step S56), the controller 40 judges whether the anode off-gas temperature is below a fourth predetermined temperature T3 for a predetermined continuous period of time (step S57).

If the controller 40 determines that the anode off-gas temperature is not below the fourth predetermined temperature T3 for the predetermined period of time ("NO" in step S57), the process returns to step S55, and the OCV operation is continued. If the controller 40 determines that the anode off-gas temperature is below the fourth predetermined temperature T3 for the predetermined period of time ("YES" in step S57), the SOFC system 100 shuts off following instructions given by the controller 40 (step S58). For example, the controller 40 shuts off the SOFC system 100 by turning off the raw fuel feeder 41, air feeder 42, water feeder 43, oxidizing gas feeder 44, and any other auxiliaries working in OCV operation.

The anode off-gas temperature may, in some cases, fall below the fourth predetermined temperature T3 despite OCV operation. In such a case, the control process according to Variation 4 recognizes that the OCV operation is not helping limit CO emissions, and shuts off the SOFC system 100.

First Predetermined Temperature T1, Third Predetermined Temperature T2, and Fourth Predetermined Temperature T3

The following describes the aforementioned first, third, and fourth predetermined temperatures T1, T2, and T3.

Each cell in the SOFC stack 6 is a multilayer structure including a solid oxide electrolyte, a fuel electrode (anode) on one side of the electrolyte, and an air electrode (cathode) on the other side. The fuel electrode is supplied with a reformate gas coming from the reformer 2 via the reformate gas feed path 13, and the air electrode with an oxidizing gas coming via the oxidizing gas feed path 5. When the SOFC stack 6 is a proton-conducting SOFC, electricity is generated as a result of the electrode reactions represented by chemical equations (6) and (7) occurring at the air and fuel electrodes, respectively, of each cell.

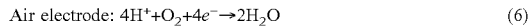

$$\text{Air electrode: } 4H^+ + O_2 + 4e^- \rightarrow 2H_2O \qquad (6)$$

$$\text{Fuel electrode: } 2H_2 \rightarrow 4H^+ + 4e^- \qquad (7)$$

As can be seen from chemical equations (6) and (7), a proton-conducting SOFC transports $H_2$ from the fuel electrode side to the air electrode side, producing water on the air electrode side. As a result, the water content of the fuel (anode off-gas) is reduced.

As shown in FIG. 3, in the case of a proton-conducting SOFC, the anode off-gas temperature threshold below which the water-gas shift reaction in the flames F is inhibited and the CO concentration increases is 500° C. It is therefore preferred that the third predetermined temperature T2 be set to 500° C., and the first predetermined temperature T1 to 550° C., 50° C. higher than the third predetermined temperature T2. When the SOFC stack 6 is a proton-conducting SOFC, setting the first predetermined temperature T1 to 550° C. and the third predetermined temperature T2 to 500° C. will increase the effectiveness of the control process for reducing failed reactions in combustion.

The reason that the first predetermined temperature T1 is set 50° C. higher than the third predetermined temperature T2 is because the operating temperature of the SOFC system 100 can fluctuate, for example as a result of disturbance or parameter changes, even in normal power-generating operation. Such changes in operating temperature during normal power-generating operation cause the anode off-gas to vary accordingly. Considering these changes in anode off-gas temperature, the first predetermined temperature T1 is set 50° C. higher than the third predetermined temperature T2, at which the CO concentration starts to increase. The first predetermined temperature T1, however, does not always need to be 50° C. higher than the third predetermined temperature T2. It is preferred to select an appropriate T1 according to changes in anode off-gas temperature that actually occur when the SOFC system 100 is in normal power-generating operation.

When the SOFC stack 6 is an oxide-ion-conducting SOFC, electricity is generated as a result of the electrode reactions represented by chemical equations (8) and (9) occurring at the air and fuel electrodes, respectively, of each cell.

$$\text{Air electrode: } 1/2O_2 + 2e^- \rightarrow O^{2-} \qquad (8)$$

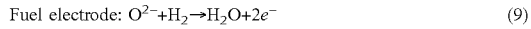

$$\text{Fuel electrode: } O^{2-} + H_2 \rightarrow H_2O + 2e^- \qquad (9)$$

As can be seen from chemical equations (8) and (9), an oxide-ion-conducting SOFC transports the oxide ion from the air electrode side to the fuel electrode side, producing water on the fuel electrode side. As a result, the water content of the fuel (anode off-gas) is increased.

As shown in FIG. 3, in the case of an oxide-ion-conducting SOFC, the anode off-gas temperature threshold below which the water-gas shift reaction in the flames F is inhibited and the CO concentration increases is 400° C. It is therefore preferred that the third predetermined temperature T2 be set to 400° C., and the first predetermined temperature T1 to 450° C., 50° C. higher than the third predetermined temperature T2. When the SOFC stack 6 is an oxide-ion-conducting SOFC, setting the first predetermined temperature T1 to 450° C. and the third predetermined temperature T2 to 400° C. will increase the effectiveness of the control process for reducing failed reactions in combustion.

Moreover, as shown in FIG. 10, at the low-temperature region near ordinary temperature, the CO concentration increased even with the control for reducing failed reactions in combustion, indicating that the control process was effective when the anode off-gas temperature was not less than 200° C. Based on this, the fourth predetermined temperature T3, used in Variation 4 to judge whether to shut off the SOFC system 100, is set to 200° C. This setting will ensure that CO emissions can be limited by shutting down the SOFC system 100 in the low-temperature region, in which the control for reducing failed reactions does not work.

In the SOFC system 100, furthermore, the control for reducing failed chemical reactions is effective when the anode off-gas temperature is as low as 200° C. Depending on the shutdown sequence, the SOFC system 100 may be shut off while the anode and cathode off-gases are still burning. In such a shutdown sequence, the anode off-gas temperature may fall to approximately 300° C. The concentration of CO emitted can be limited even in such a case.

The relationship between these first, third, and fourth predetermined temperatures T1, T2, and T3 and the operation of an SOFC system 100 can be illustrated as in FIG. 15. FIG. 15 illustrates the relationship between the operation of an SOFC system 100 according to an embodiment of the present disclosure and the first, third, and fourth predetermined temperatures T1, T2, and T3. In FIG. 15, the horizontal axis represents the anode off-gas temperature.

As shown in FIG. 15, when the anode off-gas temperature is 400+50° C. or 500+50° C. or above, the SOFC system 100 is in normal operation. When the anode off-gas temperature (fuel inlet temperature) decreases and falls below the first predetermined temperature T1 of 400+50° C. or 500+50° C., the SOFC system 100 performs a power-generation control action for preventing failed combustion reactions. In the event that the anode off-gas temperature (fuel inlet temperature) continues to fall despite the power-generation control action and sinks below the third predetermined temperature T2 of 400° C. or 500° C., the operation of the SOFC system 100 is switched to OCV operation. If the decrease in the anode off-gas temperature (fuel inlet temperature) is not stemmed until the fourth predetermined temperature T3 of 200° C. is reached, the SOFC system 100 is shut off.

It should be understood that although the SOFC systems 100 according to the above embodiment and Variations 1 to 4 perform the control for reducing failed reactions on the basis of the anode off-gas temperature detected by a first temperature sensor fitted in the anode off-gas discharge path 11, this is not the only possible configuration. For example, the controller 40 may retain a table for mapping between the temperature of the SOFC stack 6 and the anode off-gas temperature predefined in its memory (not illustrated) and may determine the anode off-gas temperature from the stack temperature detected by the second temperature sensor 15 by referring to this table. The determined anode off-gas temperature may be used as the basis for the control for reducing failed reactions.

In such a configuration, the SOFC system 100 is capable of detecting the temperature of the SOFC stack 6 and the anode off-gas temperature with the second temperature sensor 15 alone. Such a configuration therefore helps reduce sensors used in the SOFC system 100, in both number and variety.

SOFC systems according to the present disclosure are useful in SOFC systems that include a diffusion combustor in which an anode off-gas is ignited and burned with a cathode off-gas.

What is claimed is:

1. A solid oxide fuel cell system comprising:
    a fuel cell stack that generates electric power through a reaction between a fuel gas and an oxidizing gas;
    a combustor in which anode and cathode off-gases discharged from the fuel cell stack are burned by diffusion combustion;
    a temperature sensor that detects temperature of the anode off-gas flowing into the combustor; and
    a controller,
        wherein, when the controller determines that the system is in at least one of the following states (i) or (ii), the controller is programmed to instruct the system to perform a power-generation control action for preventing failed reactions in the diffusion combustion:
        (i) the temperature of the anode off-gas, detected by the temperature sensor while the solid fuel cell system is in power-generating operation, is below a first predetermined temperature for a predetermined continuous period of time; and
        (ii) the temperature of the anode off-gas, detected by the temperature sensor while the solid fuel cell system is in power-generating operation, decreases by not less than a predetermined second temperature range during a predetermined period of time, and
    wherein the controller is further programmed to instruct the system to stop the power-generation control action and switch to open circuit voltage (OCV) operation, in which the fuel cell stack does not generate power but remains fed with the fuel and oxidizing gases, when the controller determines, during the power-generation control action, that the temperature of the anode off-gas is below a third predetermined temperature, set lower than the first predetermined temperature, for a predetermined continuous period of time.

2. The solid oxide fuel cell system according to claim 1, wherein the controller is further programmed to instruct the system to perform the power-generation control action including at least one of the followings: reducing fuel utilization in the fuel cell stack, reducing a flow rate of the oxidizing gas fed to the fuel cell stack, or reducing output of the fuel cell stack.

3. The solid oxide fuel cell system according to claim 1, wherein the controller is further programmed to instruct the system to perform the power-generation control action including at least one of the followings: reducing fuel utilization in the fuel cell stack or reducing output of the fuel cell stack.

4. The solid oxide fuel cell system according to claim 1, wherein the fuel cell stack includes a plurality of solid electrolyte cells each having a proton-conducting electrolyte.

5. The solid oxide fuel cell system according to claim 1, wherein the third predetermined temperature is 400° C.

6. The solid oxide fuel cell system according to claim 1, wherein the third predetermined temperature is 500° C.

7. The solid oxide fuel cell system according to claim 1, wherein the controller is further programmed to instruct the system to shut off when the controller determines, during the OCV operation, that the temperature of the anode off-gas is below a fourth predetermined temperature, set lower than the third predetermined temperature, for a predetermined continuous period of time.

8. The solid oxide fuel cell system according to claim 7, wherein the fourth predetermined temperature is 200° C.

9. The solid oxide fuel cell system according to claim 1, wherein the temperature sensor is in the vicinity of the fuel cell stack and detects information that directly or indirectly indicates the temperature of the anode off-gas flowing into the combustor.

10. The solid oxide fuel cell system according to claim 1, wherein the power-generating operation is a controlled operation for startup power generation, which is an operation that the system performs after a startup controlled operation and before temperature of the fuel cell stack reaches a level at which the system can generate electricity to an extent that an external load can be powered steadily, and in which the system warms the fuel cell stack by taking out an amount of power smaller than rated power and thus producing heat associated with power generation in the fuel cell stack.

11. The solid oxide fuel cell system according to claim 1, wherein the temperature sensor is disposed in an anode off-gas discharge path and between the fuel cell stack and the combustor, the temperature sensor detecting the temperature of the anode off-gas prior to the anode off-gas flowing into the combustor.

* * * * *